(12) United States Patent
Law

(10) Patent No.: US 7,808,891 B2
(45) Date of Patent: Oct. 5, 2010

(54) SYSTEM AND METHOD FOR STREAMING VIDEO ON DEMAND (VOD) STREAMS OVER A LOCAL NETWORK

(75) Inventor: Harmon F. Law, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 99 days.

(21) Appl. No.: 12/183,269

(22) Filed: Jul. 31, 2008

(65) Prior Publication Data

US 2009/0034540 A1   Feb. 5, 2009

Related U.S. Application Data

(60) Provisional application No. 60/953,489, filed on Aug. 2, 2007.

(51) Int. Cl.
*H04L 12/26* (2006.01)
(52) U.S. Cl. ...................................................... 370/217
(58) Field of Classification Search ........................ None
See application file for complete search history.

(56) References Cited

U.S. PATENT DOCUMENTS

| | | | |
|---|---|---|---|
| 6,195,356 B1 * | 2/2001 | Anello et al. | 370/398 |
| 7,089,324 B1 * | 8/2006 | Milius et al. | 709/240 |
| 7,272,138 B2 * | 9/2007 | Bender | 370/390 |
| 7,624,195 B1 * | 11/2009 | Biswas et al. | 709/245 |
| 2003/0093798 A1 | 5/2003 | Rogerson | |
| 2005/0138149 A1 | 6/2005 | Bhatia | |
| 2006/0002385 A1 * | 1/2006 | Johnsen et al. | 370/389 |
| 2007/0077998 A1 | 4/2007 | Petrisor | |
| 2007/0127460 A1 | 6/2007 | Wilber et al. | |

* cited by examiner

*Primary Examiner*—Chirag G Shah
*Assistant Examiner*—Amarnauth Persaud
(74) *Attorney, Agent, or Firm*—Drinker Biddle & Reath LLP

(57) ABSTRACT

A system and method for streaming numerous video on demand (VOD) streams over a network, such as a local area medium sized network on a vehicle such as an aircraft. The system and method that provides redundant and restricted paths for streaming numerous VOD streams while providing maximum bandwidth for traffic from multiple sources with minimal packet loss due to contention.

18 Claims, 20 Drawing Sheets

SYSTEM AND METHOD FOR STREAMING VIDEO ON DEMAND (VOD) STREAMS OVER A LOCAL NETWORK

CROSS REFERENCE TO RELATED APPLICATIONS

This patent application claims the benefit of U.S. Provisional Patent Application No. 60/953,489, filed Aug. 2, 2007, and herein incorporated by reference.

BACKGROUND

1. Field

The present invention relates to a system and method for streaming numerous video on demand (VOD) streams over a network, such as a local area, medium-sized network on a vehicle, such as an aircraft. More particularly, the present invention relates to a system and method that provides redundant and restricted paths for streaming numerous VOD streams while providing maximum bandwidth for traffic from multiple sources with minimal packet loss due to contention.

2. Description of the Related Art

In certain networks, such as those for providing VOD streams to video display devices, it can be desirable for the network to have redundant paths from the VOD sources to each video display device. By configuring the network in this manner, if the original path from the VOD source to the video display device fails, the redundant path can be used to continue to provide the VOD stream to the video display device without the viewer experiencing any significant interruption in viewing the video.

As can be appreciated by one skilled in the art, one technique for providing network redundancy employs a "spanning tree," such as that defined in IEEE Standards 802.1D-2004 and 802.1w. This type of spanning tree provides a loop-free path when multiple paths exist in a switched or bridged Ethernet network. However, spanning trees of this nature provide no method for controlling the traffic across the established links, and only provide a single link between switches. Also, even though a spanning tree provides a loop-free path with backup, it does not handle problems that can occur due to a loss of a server.

In addition, although spanning trees are intended to be transparent to the hosts on the network, during video streaming, the clients (e.g., video display devices) very rarely send traffic to the server once they have started receiving video streams. Therefore, if the network has a failure and a new network path is created via the spanning tree, the switches in the new path are not automatically updated with the client Ethernet addresses. Hence, the switches become flooded with streams destined for clients that need to receive their streams via the new path. The streams will continue to flood the switches until the clients communicate to the server via the new network path, and the server updates the switches with the port or ports to which the clients' address need to be registered.

One way to mitigate this flooding problem would be to statically assign the Ethernet addresses to the switches. However, this is a very cumbersome and data intensive operation that requires special software to implement and validate its correctness, and does not scale well to large networks. Another way is for the clients to acknowledge each packet, or send periodic heartbeat messages to the servers. Although clients can use transmission control protocol (TCP) to acknowledge each packet, sending video via TCP creates substantial overhead on the servers and network, and would require special software, while also not scaling well and creating additional traffic to the servers that would limit the number of streams the servers could send in a large network. Alternatively, routers can be employed instead of switches, but routers are more expensive and require additional space and power which are both very limited in certain settings, such as on an airplane or other vehicle.

SUMMARY

Accordingly, a method is provided for sending information from head-end equipment in an in-flight entertainment system (IFES) comprising switches, to one of a plurality of seat-end devices in seat-end equipment in the IFES, the method comprising: assigning each of the switches and seat-end devices to at least one subnet in the IFES; issuing, by the one seat-end device, a request for the information; tagging, by a switch that receives the request, the request based on the subnet in which the one seat-end device resides; and sending the information from the head-end equipment to the seat-end device along an original path including at least one of the switches based on the tag of the request.

The method may further comprising operating any of the switches to allow the request to travel in a direction toward the head-end equipment based on the tag while prohibiting the request from traveling in a direction toward the seat-end device as well as assigning step includes arranging the subnets as virtual local area networks (VLANs).

The method may comprise establishing a redundant path, including at least one switch different from said at least one switch in the path, from the head-end equipment to the seat-end device based on the request; and when a failure occurs in the original path, sending the information along the redundant path to the seat-end device. The redundant path and the original path may be simultaneously active. When the failure occurs in the original path, the method may include sending the information along the simultaneously active redundant path to the seat-end device without reconfiguring the network. The seat-end device may include a smart video display unit (SVDU) or a tethered passenger control unit (TPCU).

The method may further comprise providing periodic messages from the head-end equipment to the seat-end equipment to notify the seat-end equipment of operation of the head-end equipment. The seat-end equipment may include a plurality of seat electronics boxes, at least one of which having a smart video display unit (SVDU) coupled thereto; and the method further comprises operating any of the seat electronics boxes having at least one SVDU coupled thereto to refrain from forwarding the periodic messages to the SDVU. A low-latency audio public address (LLAP) message may be provided from the head-end equipment to the seat-end equipment.

The seat-end equipment may include a plurality of seat electronics boxes, at least one of which having a smart video display unit (SVDU) coupled thereto; and the method may further comprise operating any of the seat electronics boxes having at least one SVDU coupled thereto to refrain from forwarding the LLAP message to the SDVU. The assigning step may include assigning respective Internet Protocol (IP) addresses to each of the head-end equipment, switches and seat-end equipment.

The method may further comprise mapping a tagged frame to a virtual local area network (VLAN) using port-based mapping based on a switch port on which the frame arrives, and may further comprise declaring a VLAN association by an end station or switch using a tag field carried within a frame.

A VLAN Protocol Identifier (VPID) field may be provided that identifies the frame as being VLAN tagged, and the VPID field is used to differentiate tagged frames from untagged frames, and the method may further comprise assigning IP addresses to column devices so that the column devices will be part of the same subnet. Redundant wiring may be provided for the column devices and two IP addresses may be assigned per device such that all devices in paired columns have IP addresses in the same two subnets.

A system is also disclosed for providing in-flight entertainment data in a vehicle, comprising: head-end equipment; seat-end devices comprising seat-end equipment; an original path connecting the head-end equipment and a seat-end device that is one of the seat-end devices via a network subnet; and a switch within the original path that is assigned to the subnet; the seat-end device having an output at which it sends a request for information, the switch having an input at which it receives the request for information and tags it based on the subnet in which the seat-end device resides, and the head-end equipment having an output at which it sends information requested to the seat-end device along the original path including the switch based on the tag of the request.

The system may further comprise a redundant path that is active when the original path is active, the redundant path including at least one switch different from the switch in the original path, from the head-end equipment to the seat-end device based on the request, such that when a failure occurs in the original path, information is sent along the redundant path to the seat-end device.

TABLE OF ACRONYNMS

| | |
|---|---|
| ADB | Area Distribution Box |
| ARP | Address Resolution Protocol |
| AVC-D | Audio Video Controller (Digital) |
| ATP | Asynchronous Transmission Protocol |
| BIOS | Basic Input-Output System |
| BOOTP | Bootstrap Protocol |
| CFI | Canonical Format Indicator |
| CPU | Central Processing Unit |
| DHCP | Dynamic Host Configuration Protocol |
| DSP | Digital Signal Processor |
| ESU | Ethernet Switch Unit |
| FDB | Floor Disconnect Boxes |
| FO | Fiber Optics |
| FPGA | Field Programmable Gate Array |
| FSM | Finite State Machine |
| IFES | In-flight Entertainment System |
| IGMP | Internet Group Management Protocol |
| IMP | In-band Management Port |
| IP | Internet Protocol |
| IVL | Independent VLAN Learning |
| LAN | Local Area Network |
| LLAP | Low-latency Audio Public Address |
| LLDP | Link Layer Discovery Protocol |
| LOPA | Layout Per Aircraft |
| LRU | Line Replaceable Unit |
| MAC | Media Access Control |
| MIB | Management Information Base |
| MPEG | Moving Picture Experts Group (protocol) |
| MTU | Maximum Transmission Unit |
| OSI | Open Systems Interconnection |
| OUI | Organizationally Unique Identifier |
| PED | Personal Electronics Device |
| PPC | Powered Personal Computer |
| RTP | Real-time Transport Protocol |
| QSEB | Quad-seat Electronics Box |
| RFC | Request for Comments |
| SEB | Seat Electronics Box |
| SerDes | Serialize-Deserialize |
| SNMP | Simple Network Management Protocol |
| SVDU | Smart Video Display Units |

-continued

TABLE OF ACRONYNMS

| | |
|---|---|
| SVL | Shared VLAN Learning |
| TCI | Tag Control Information |
| TCP | Transmission Control Protocol |
| TPCU | Tethered Passenger Control Units |
| TTL | Time to Live |
| UDP | Universal Datagram Protocol |
| VLAN | Virtual Local Area Network |
| VOD | Video on Demand |
| VPID | VLAN Protocol Identifier |

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE EMBODIMENTS

As discussed in detail below, the present invention relates to a system and method for streaming numerous VOD streams in a network, in particular, a local area medium sized network that is deployed on a vehicle such as an aircraft, train, bus, ship, and so on, or in any other suitable mobile or stationary setting, and which utilizes VLANs and IP subnets to control traffic in the network. The system and method provide multiple controlled paths for video streaming and other traffic to clients, such as video display devices, on a switched network, while providing redundancy and restricted paths for traffic to maximize or at least enhance the use of existing bandwidth for traffic from multiple sources and eliminate or at least minimize packet loss due to contention.

According to the system and method, each client has two active paths to head-end servers and thus, the network does not need to reconfigure itself in the case of a failure. Also, the architecture according to the system and method provides Layer 3 (the network layer) routing functionality at Layer 2 (the data link layer) without the need for routers, which can maximize the amount of traffic a server can stream without packet loss due to merging streams in the network switches. The system and method should also be compatible with different types of vehicle arrangements, and in particular, different aircraft types (e.g., A380, LR, B777) and different customer configurations that use the same aircraft type (e.g. MAS A380, AFR A380, ETD A380).

Figure 1:
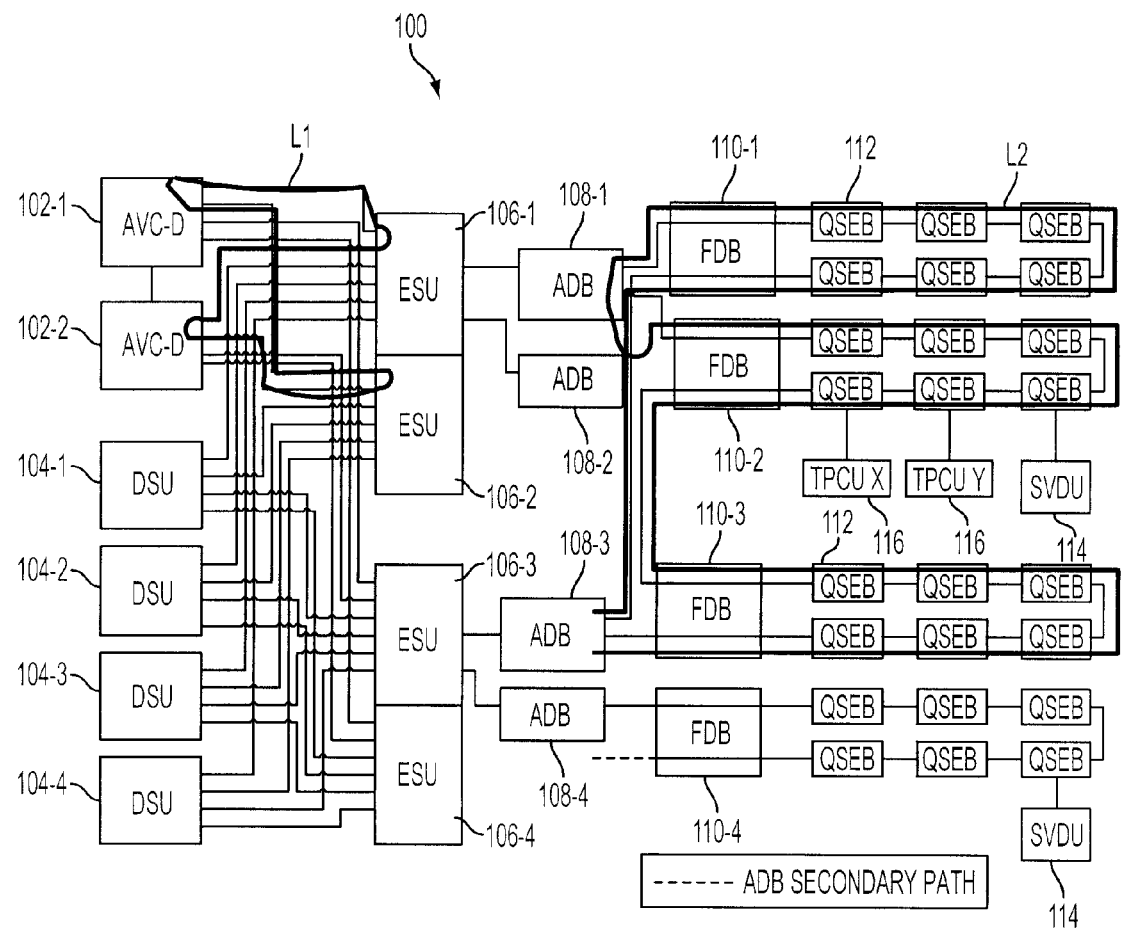
FIG. 1 is a conceptual block diagram illustrating an example of an in-flight entertainment system (IFES) configuration employing a system and method according to an embodiment of the present invention.

FIG. 1 is a block diagram illustrating an example of components of an in flight entertainment system (IFES) 100 employing an embodiment of the present invention. This type of wiring layout can be employed in an aircraft, such as the A380, LR, B777 and so on, or in any other suitable multi-passenger vehicle such as a train, bus, boat and so on.

As illustrated, the IFES 100 includes a plurality of digital audio video controllers (AVC-D) 102. This exemplary arrangement illustrates two AVC-Ds 102-1 and 102-2, but the IFES 100 can include any practical number of AVC-Ds 102. The IFES 100 further includes a plurality of data service units (DSU) 104. In this example, the IFES 100 includes DSUs 104-1 through 104-4, and Ethernet switch units (ESU) 106-1 through 106-4.

ESUs 106 couple the AVC-Ds 102 and DSUs 104 to four area distribution boxes (ADB) 108-1 through 108-4, which are coupled to a plurality of quad-seat electronics boxes (QSEB) 112 via floor disconnect boxes (FDB) 110-1 through 110-4. The QSEBs 112 are each further coupled to smart video display units (SVDU) 114 and/or tethered passenger control units (TPCU) 116. Because the SEBs 112 are quad-SEBs 112, they can be coupled to up to four units, such as SVDUs 114. As can further be appreciated, the IFES 100 can include any suitable number of AVC-Ds 102, DSUs 104, ESUs 106, ADBs 108, FDBs 110 and QSEB 112 in any suitable wiring configuration. Also, the AVC-Ds 102, DSUs 104, ESUs 106, ADBs 108, and QSEB 112 can generally be referred to herein as a "line replaceable unit" (LRU). An FDB 110 typically would not be referred to as an LRU because it provides a direct wired connection as is not IP addressable as discussed in more detail below.

As with the system and method according to an embodiment of the present invention, the IFES 100 itself should be compatible with different types of vehicle arrangements, and in particular, different aircraft types (e.g., A380, LR, B777) and different customer configurations that use the same aircraft type (e.g. MAS A380, AFR A380, ETD A380). The IFES 100 should also define a "factory" setting for each types of LRUs so that any new LRU can be installed in the IFES 100 without disrupting the system network. The "factory" setting should not introduce loops and should allow information to be downloaded to the LRU, and should also be independent of any customer configurations. This "factory" setting is also referred to herein as the ATP configuration. In addition, the IFES 100 should provide an "operational" configuration for each LRU that allows the IFES 100 to support all services for which the IFES 100 is designed. This configuration can be part of the downloadable software and can be customer dependent, even though the configuration can be made as general as possible. This "operational" configuration is referred to herein as the "network configuration".

As described in more detail below, the redundant wiring between the components as shown in FIG. 1 can create various Ethernet loops. For instance, an Ethernet loop L1 can exist involving AVC-Ds 102-1 and 102-2 and ESUs 106-1 and 106-2. An Ethernet loop L2 can exist involving ADBs 108-1 and 108-3, FDBs 110-1, 110-2 and 110-3, and numerous QSEBs 112.

Figure 2:
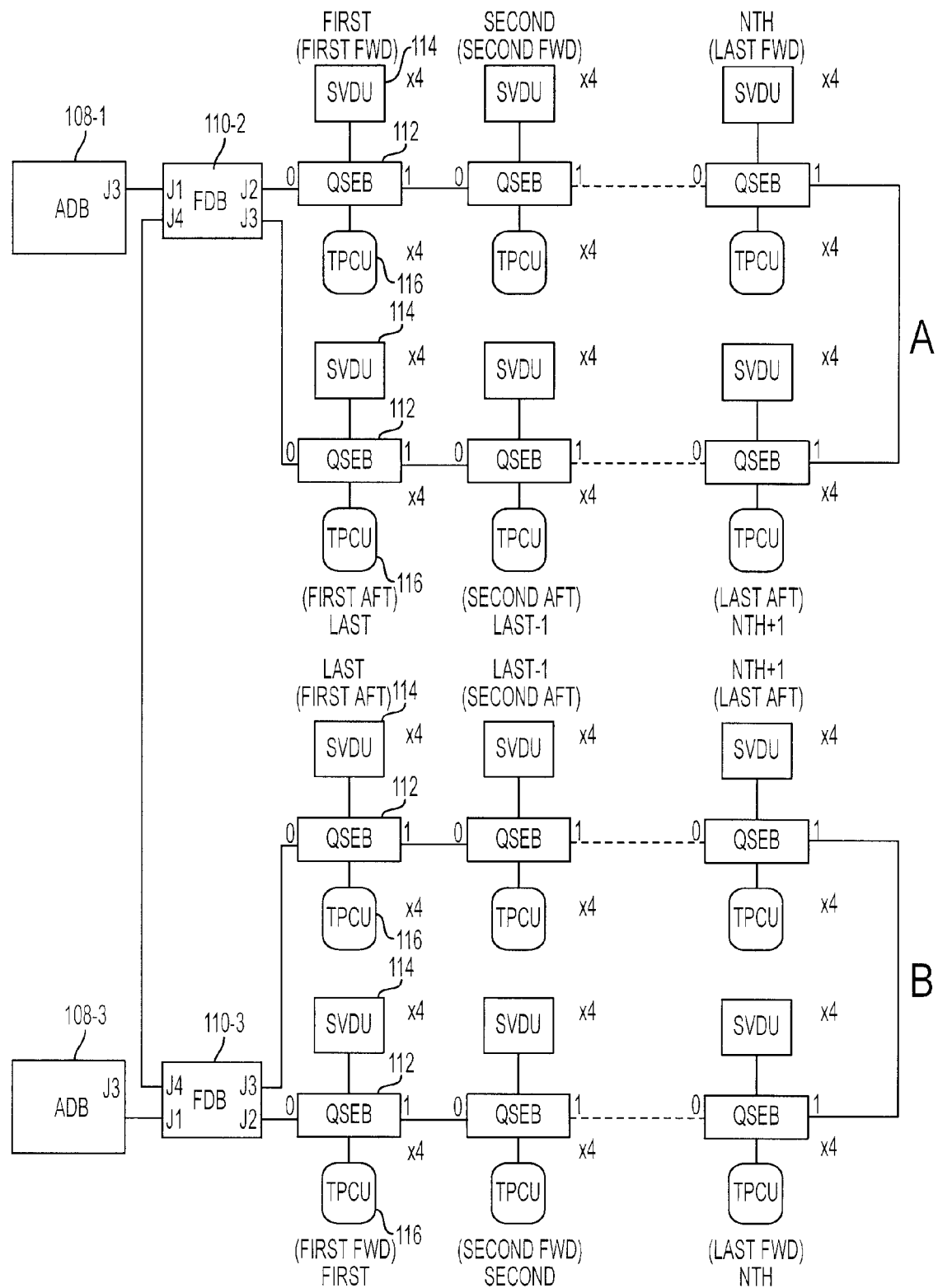
FIG. 2 is a conceptual block diagram illustrating an example of different subnets that can exist in the IFES shown in FIG. 1.

For illustrative purposes, FIG. 2 provides a more detailed view of an example of the redundant connections between two ADBs 108-1 and 108-3, FDBs 110-2 and 110-3 and their associated QSEBs 112 which are connected to SVDUs 114 and/or TPCUs 116 as discussed above. As can be appreciated by one skilled in the art, ports J1 and J2 of FDB 110-2 in this example provide a connection between to couple ADB 108-1 to the QSEB 112 connected to port J2. Also, ports J4 of FBDs 110-2 and 110-3 are coupled to each other. Therefore, port J3 and J4 of FDB 110-2 and ports J4 and J3 of FDB 110-3 provide connections to couple the QSEB 112 connected to port J3 of FDB 110-2 to the QSEB 112 connected to port J3 of FBD 110-3. Ports J1 and J2 of FDB 110-3 couple the QSEB 112 connected to port J2 of FDB 110-3 to ADB 108-3 as shown.

Figure 3:
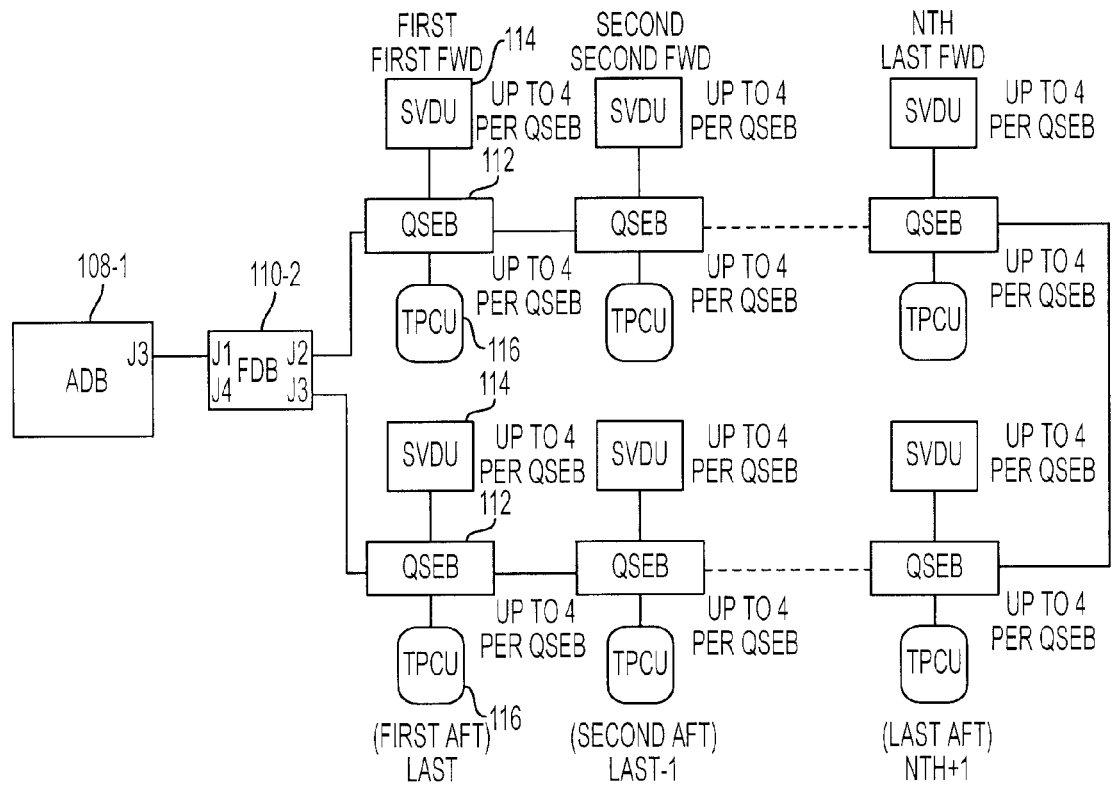
FIG. 3 is a conceptual block diagram further illustrating an example of a subnet as shown in FIG. 2.
Figure 4:
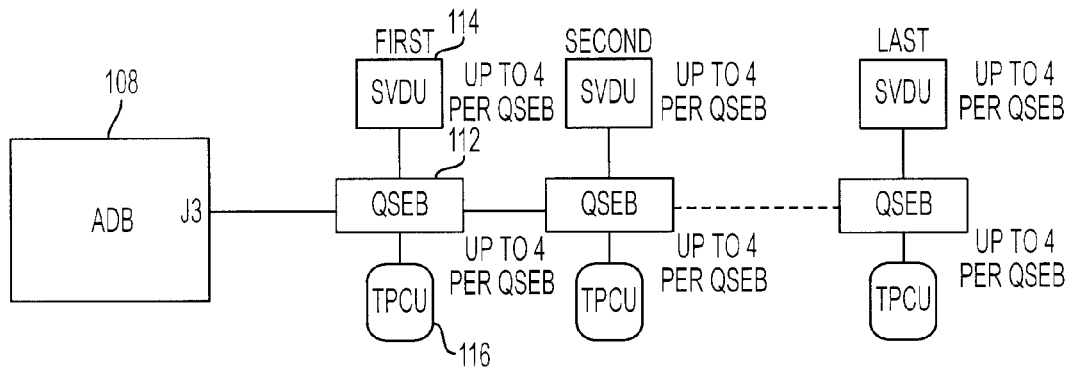
FIG. 4 is a conceptual block diagram illustrating an alternate connection of the components of the IFES as shown in FIG. 1.

For purposes of example, ADB 108-1, FDB 110-2 and their associated QSEBs 112, SVDUs 114 and TPCUs 116 are referred to as Subnet A, and ADB 108-3, FDB 110-3 and their associated QSEBs 112, SVDUs 114 and TPCUs 116 are referred to as Subnet B. As can be appreciated from FIG. 2, a subnet (e.g., Subnet A) includes the components as shown in FIG. 3. The arrangement shown in FIG. 3 can also be employed on vehicles, such as an Airbus aircraft, that do not require redundancy. Alternatively, as shown in FIG. 4, a seat column can comprise QSEBs 112, SVDUs 114 and TPCUs 116 directly connected to an ADB 108. This type of configuration can be employed, for example, in a B777 aircraft or any other suitable vehicle as appropriate.

Figure 5:
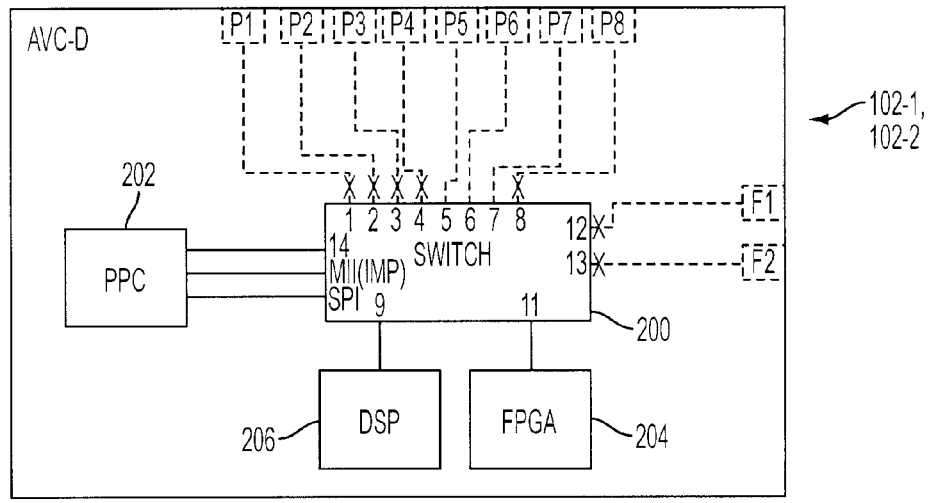
FIG. 5 is a block diagram illustrating an example of the components of a digital audio video controller (AVC-D) employed in the IFES shown in FIG. 1.

FIG. 5 illustrates an example of components of an AVC-D 102 employed in the IFES 100 shown in FIG. 1. As can be appreciated by one skilled in the art, an AVC-D 102 includes an Ethernet switch 200, such as a Broadcom BCM5396 that has 16 Gigabit ports. In this example, the switch 200 is connected to a power personal computer (PPC) 202, a field programmable gate array (FPGA) 204, and a digital signal processor (DSP) 206 through serialize-deserialize (SerDes) interfaces. The switch 200 also uses an SPI interface to set its registries, and a GMII/RGMII interface, also referred as In-band Management Port (IMP), for management. An AVC-D 102 in this example also provides 8 Gigabit copper ports (P1-P8) and 2 Gigabit fiber ports (F1 and F2).

Figure 6:
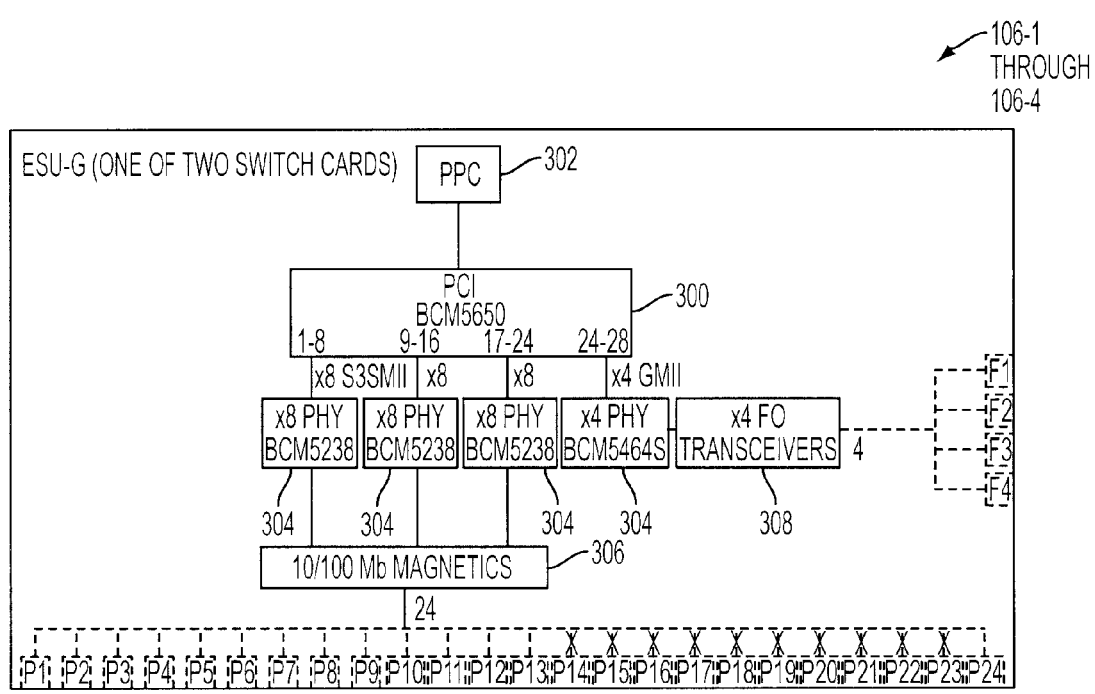
FIG. 6 is a block diagram illustrating an example of the components of an Ethernet switch unit (ESU) employed in the IFES shown in FIG. 1

FIG. 6 illustrates an example of an ESU 106 employed in the IFES 100 shown in FIG. 1. In that example, each ESU 106 is configured as an independent switch card as shown in FIG. 6, and two ESUs 106 (e.g., ESUs 106-1 and 106-2) are arranged as an ESU. Hence, in the arrangement shown in FIG. 1, the IFES 100 has two ESUs, with the combination of ESUs 106-1 and 106-2 being referred to as one ESU and the combination of ESUs 106-3 and 106-4 being referred to as the second ESU.

Each ESU 106-1 through 106-4 includes a switch 300, such as a Broadcom BCM5650 supports twenty-four 100 BaseT ports, and 4 Gigabit ports. The 100BaseT ports can be configured in an ARINC connector, for example, and are shown as ports P1-P24. The Gigabit ports can be configured as a fiber optics connector, and are shown as ports F1-F4. The switch 300 is connected to an internal processor (PPC) 302 through a PCI interface in this example. The switch 300 is further connected to the ports P1-P24 via Ethernet transceivers 304 which can be, for example, Broadcom BCM5238 transceivers, and a 10/100 MB magnetics module 306. The switch 300 is also connected to ports F1-F4 via an Ethernet transceiver 304 and a fiber optics (FO) transceiver 308.

Figure 7:
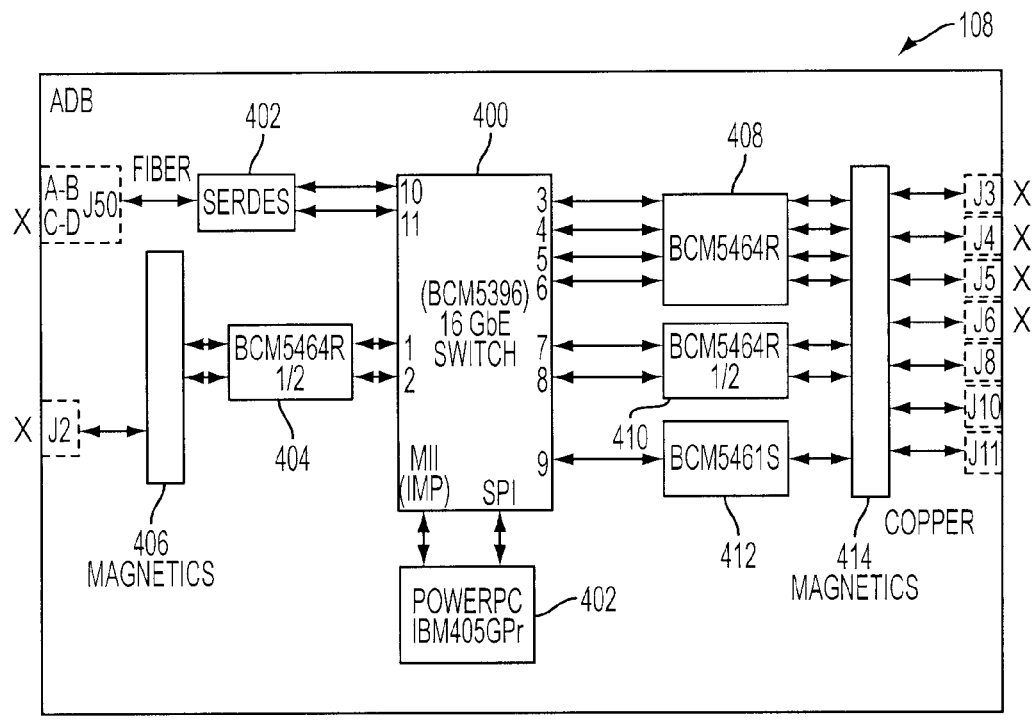
FIG. 7 is a block diagram illustrating an example of the components of an area distribution box (ADB) employed in the IFES shown in FIG. 1

FIG. 7 illustrates an example of an ADB 108 employed in the IFES 100 shown in FIG. 1. In this example, the ADB 108 includes an Ethernet switch 400, such as a Broadcom BCM5396 that is a 16-port Gigabit switch. The switch 400 is connected to a PPC 402, such as an IBM405GPr, through MII and SPI interfaces in this example. The switch 400 in this example is further connected via a SerDes interface 402 to a 2 Gigabit fiber port identified as pins A-B and C-D of a connector port J50, and is connected to a port J2 via a portion of an Internet transceiver 404 such as a Broadcom 5464R transceiver and a magnetics module 406. The switch 400 is also connected to 8 Gigabit copper ports at connectors J3-J6, J8, J10, and J11 via Internet transceivers 408 and 410, which can be Broadcom 5464R transceivers, another Internet transceiver 412, which can be a Broadcom 5461S transceiver, and a magnetics module 414.

Figure 8:
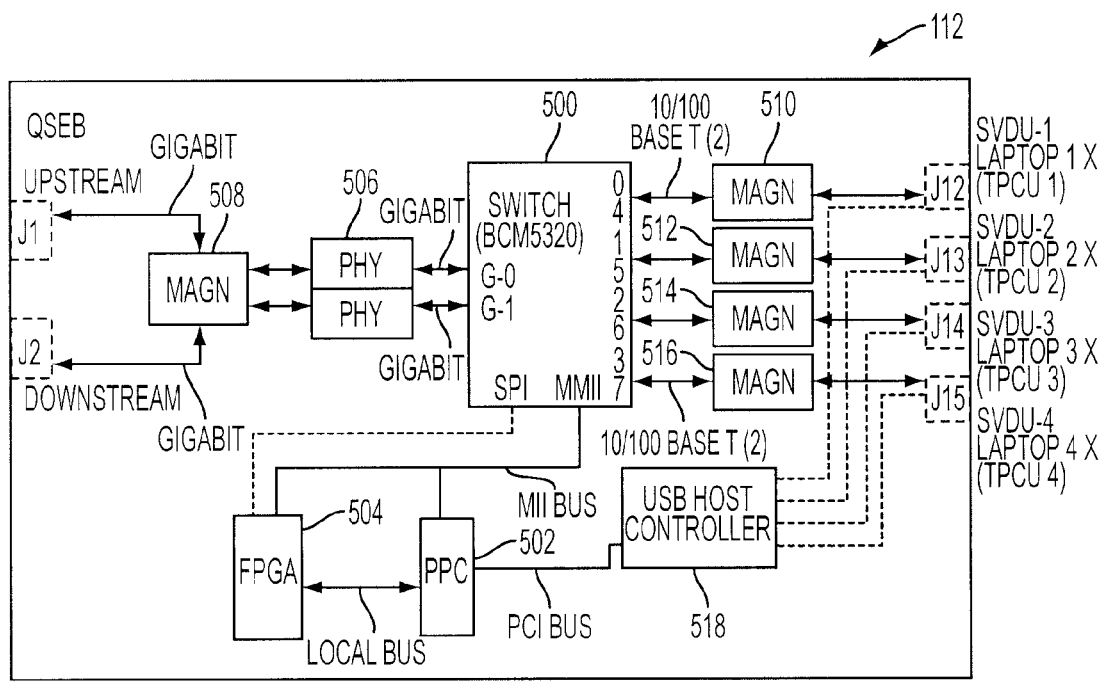
FIG. 8 is a block diagram illustrating an example of the components of a quad seat electronics box (QSEB) employed in the IFES shown in FIG. 1

FIG. 8 illustrates an example of a QSEB 112 employed in the IFES 100 shown in FIG. 1. In this example, the QSEB 112 includes an Ethernet switch 500, which can be a Broadcom BCM5320 Ethernet switch, that is connected to a PPC 502 and FPGA 504 via an MII bus, for example. The switch 500 is also connected to the FPGA 504 via tapping into the receive lines of the MII interface. The switch 500 in this example is connected to connectors J1 and J2 via Ethernet switches 506 and magnetics module 508, and is connected to connectors J12, J13, J14 and J15 via magnetics modules 510, 512, 514 and 516, respectively. Accordingly, the QSEB 112 has 8 100BaseT ports plus 2 Gigabit ports, with the 2 Gigabit copper interfaces coupling to an ADB 108, FDB 110, or another QSEB 112 at connectors J1 and J2, and the 8 10/100 BaseT interfaces coupling to SVDUs 114 and personal electronics devices (PEDs) at connectors J12, J13, J14, and J15 (each connector has two Ethernet interfaces. It is further noted that all QSEBs 112 and SVDUs 114 are capable of communicating with the head end equipment at the same time and therefore, the upstream/downstream ports and the SVDU ports remain open.

Example of the setup and operations of the IFES 100 according to embodiments of the present invention will now be described.

Turning back to FIG. 1, the LRUs with embedded switches, such as the AVC-Ds 102, DSUs 104, ESUs 106, ADBs 108, and QSEB 112, use specific initial settings to ensure proper configuration in any possible configuration (e.g., a particular aircraft configuration). The very first initial setting can be achieved by hardware straps which can, for example, place all switch chips into a state where all switch ports are disabled. In the switches employed in the AVC-Ds 102, DSUs 104, ESUs 106, ADBs 108, and QSEB 112, such as the Broadcom switches discussed above, this can be accomplished by setting the switch in managed mode.

The next step in initializing the switch can be performed by the basic input/output system (BIOS) of the CPU, which can be employed in the PPC of the LRU as discussed above. Since the BIOS typically contains only generic device drivers, the BIOS sets the switch chip to non-managed mode to ensure that proprietary frames are not forwarded to the CPU. The BIOS can also enable the CPU port and the minimum set of other ports that may be required to Bootstrap Protocol (BOOTP) a new operating system. The LRU asynchronous transfer protocol (ATP) software can be downloaded at the end of the LRU production phase, and is available the first time an LRU is installed on an aircraft. After downloading the system software, that is, the software that is for a particular IFES 100, the ATP software generally is not used any more for normal operations.

As mentioned above, the ports of the LRUs can be connected differently depending on the overall configuration of the IFES 100. For example, in an IFES 100 employed in an Airbus A380 aircraft, the external ports can be connected as shown in Table 1:

TABLE 1

Example of Port Connections for the AVC-Ds

| AVC-D 102-1 | | AVC-D 102-1 | |
|---|---|---|---|
| Port | Connected to | Port | Connected to |
| P1 | ESU 106-1 switch 1 (Port 13) | P1 | ESU 106-1 switch 1 (Port 20) |
| P2 | ESU 106-2 switch 2 (Port 13) | P2 | ESU 106-2 switch 2 (Port 20) |
| P3 | ESU 106-3 switch 1 (Port 13) | P3 | ESU 106-3 switch 1 (Port 20) |
| P4 | ESU 106-4 switch 2 (Port 13) | P4 | ESU 106-4 switch 2 (Port 20) |
| P5 | Not connected | P5 | AVC-D 102-1 (Port 6) |
| P6 | AVC-D 102-2 (Port 5) | P6 | Not connected |
| P7 | Portable Data Loader (PDL) | P7 | Not connected |
| P8 | Flight Attendant Panel (FAP) | P8 | Flight Attendant Panel (FAP) |
| F1 | ADB 108-1 (CWS/COC/RCC) | F1 | ADB 108-2 (CWS/COC/RCC) |
| F2 | Not connected | F2 | Not connected |

For a long range (LR) aircraft, the external ports can be connected as shown in Table 2:

TABLE 2

Another Example of Port Connections for an AVC-D
AVC-D 102-1

| Port | Connected to |
|---|---|
| P1 | ESU 106-1 switch 1 (Port 24) |
| P2 | ESU 106-2 switch 2 (Port 24) |
| P3 | |
| P4 | |
| P5 | Not connected |
| P6 | Not connected |
| P7 | Portable Data Loader (PDL) (VCC) |
| P8 | |
| F1 | |
| F2 | |

For a B777, the external ports can be connected as shown in Table 3:

TABLE 3

Another Example of Port Connections for an AVC-D
AVC-D 102-1

| Port | Connected to |
|---|---|
| P1 | ESU 106-1 switch 1 (Port 24) |
| P2 | ESU 106-2 switch 2 (Port 24) |
| P3 | Microcontroller Unit (MCU) |
| P4 | Not connected |
| P5 | Not connected |
| P6 | Not connected |
| P7 | Data Loader Port 3 (VCC) |

TABLE 3-continued

Another Example of Port Connections for an AVC-D
AVC-D 102-1

| Port | Connected to |
|---|---|
| P8 | Not connected |
| F1 | Not connected |
| F2 | Not connected |

Table 4 flow illustrates examples of the manner in which the external ports of an ESU 106-1 can be connected:

TABLE 4

An Example of Port Connections for an ESU

| ESU 106-1 | Connected to | | |
|---|---|---|---|
| Port # | A380 | LR | B777 |
| P1-P12 | DSU 104-1 #1-#12 | DSU 104-2 #1-#12 | DSU 104-2 #1-#12 |
| P13 | AVC-D 102-1 | | |
| P14-P19 | DSU 104-2 #13-#18 | | |
| P20 | AVC-D 102-2 | | |
| P21 | | | |
| P22 | | | |
| P23 | | | |
| P24 | | | AVC-D 102-1 |
| F1-F4 | ADB 108-1 | | |

As can further be appreciated by one skilled in the art, to better manage network traffic, in particular, streaming media, in the IFES 100, the IFES 100 is configured to have multiple broadcasts domains. Accordingly, every seat-end-device, such as an SVDU 112 or TPCU 116, on a column is in a sub-network that can directly reach any head-end device, such as an AVC 102, and vice-versa. For a seat-end-device to reach another seat-end device that is not in the same sub-network (column), the traffic can be routed through one of its designated head-end routers. This configuration will reduce the magnitude of broadcasts to the seat-end devices and still be completely transparent to application software.

In order to achieve this type of operation, the IP addresses of every seat-end-device (e.g., an SVDU 114 or TCPU 116) is in the same subnet of every other device in its column, as discussed in more detail below. Additionally, every head-end device (e.g., an AVC-D 102 or DSU 104) that the seat-end-device needs to communicate with also has an address within the same subnet. As discussed in more detail below, the seat-end network is configured with VLANs in a manner that prevents any traffic coming from a seat-end device from directly accessing any seat-end device outside its column. This configuration thus prevents loops between the primary and secondary paths to the head-end devices, and also minimizes the amount of broadcast traffic flow throughout the IFES 100.

Before discussing the features and operation of the IFES 100 according to embodiments of the present invention, general aspects of LAN and Ethernet technology will first be discussed.

As can be appreciated by one skilled in the art, user applications, such as those which generate multimedia displays on an SVDU 114, typically rely on a transmission control protocol/Internet protocol (TCP/IP) protocol suite. A TCP/IP protocol suite can be mapped to an open systems interconnection (OSI) model, as shown in Table 5 below.

TABLE 5

Mapping of TCP/IP Suite to OSI Model

| OSI model | TCP/IP suite |
|---|---|
| User applications | User applications |
| Layer 7  Application | Application protocols (HTTP, |
| Layer 6  Presentation | SMTP, RTP, etc . . .) |
| Layer 5  Session | TCP            UDP |
| Layer 4  Transport | |
| Layer 3  Network | IP |
| Layer 2  Data-Link | Ethernet |
| Layer 1  Physical | |
| Transmission media | Copper/Fiber |

Figure 9:
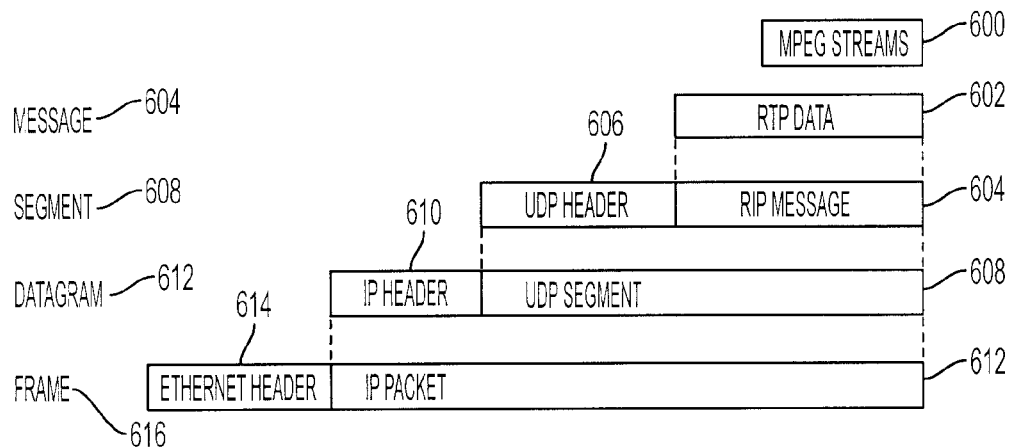
FIG. 9 is a conceptual data structure diagram illustrating an example of an encapsulation process that can be performed in the IFES shown in FIG. 1.

When two user applications exchange data, they typically use all layers of the TCP/IP stack, and each layer relies on the next lower layer to deliver its data. The data from one layer are typically encapsulated in the lower layer with the relevant format. For example, for the delivery of an MPEG stream between a server and a client, the MPEG stream is encapsulated in a real-time transport protocol (RTP) message that constitutes the payload encapsulated in the next lower layer, and so on, until transmission over the transmission media. An example of this encapsulation process is shown in FIG. 9, with the MPEG stream 600 being encapsulated in the RTP data 602 to form a message 604, to which is added a user datagram protocol (UDP) header 606 to form a UDP segment 608. An IP header 610 is then added to the UDP segment 608 to form a datagram 612 or, in other words, and IP packet 612, to which is added an Ethernet header 614 to form a frame 616.

Figure 10:
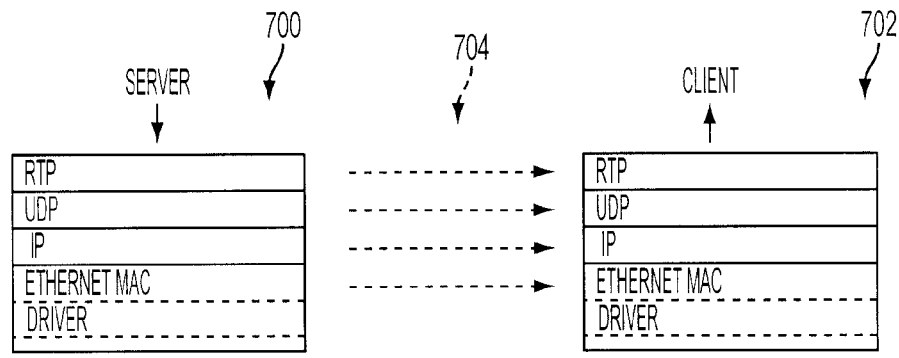
FIG. 10 is a conceptual data structure/flow diagram illustrating an example of the relationship between server and client stacks that can be employed in the IFES shown in FIG. 1.

Accordingly, as shown in FIG. 10, a server that can be located, for example, in an AVC-D 102 encapsulates the MPEG stream in the RTP data of the frame 616, and the client (e.g., an SVDU 114) extracts the MPEG stream from the RTP data. As indicated, there is a logical link between the layers in the stack 700 at the server and the stack 702 at the client, and a physical link through the transmission medium 704.

As can be appreciated by one skilled in the art, traditional LANs provide a means for multiple devices to share a common high-speed communications channel.

Figure 11:
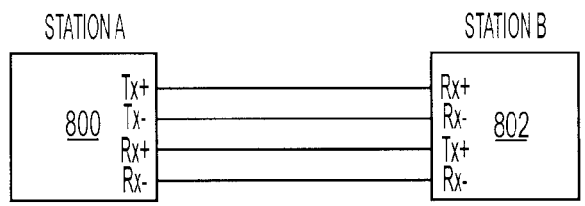
FIG. 11 is a block diagram illustrating an example of a full duplex connection between two stations in the IFES shown in FIG. 1.

The use of dedicated media connections and low-cost switches provides the channel architecture in such a way that it became possible for a station to transmit and receive simultaneously, which is referred to as a full duplex operation. As understood by one skilled in the art, a full duplex channel typically refers to a single communication medium that can be used for transmission and reception at the same time, and the type of connection commonly used in LAN networks is in actuality a dual simplex channel but is referred to as a full duplex connection. FIG. 11 illustrates a type of 100BaseT full duplex connection between two stations, referred to as Station A 800 and Station B 802.

Generally, a LAN is able to operate in full duplex mode through the use of dedicated media and the use of microsegmented, dedicated LANs, as provided by switches. The use of dedicated media systems allows the deployment of switching hubs instead of traditional repeaters at the center of a star-wiring system. With a repeater, all devices connecting to the hub share the available channel and have to arbitrate for access. However, with a switching hub, each of the attached devices has a dedicated channel between itself and the hub. A switching hub, unlike a repeater, has a MAC entity for each of its ports. Architecturally, each of the connections to the switching hub constitutes a distinct LAN, with access to each LAN arbitrated independently of all others. A switch with n ports constitutes n (traditional) LANs, one for each port as shown, for example, in FIG. 12. That is, switch 900 having a switching fabric 902 connects four LANs 904, 906, 908 and 910 in this example. This network architecture is sometimes called switched LAN, or catenet. IFES 100 in the example described herein implements a full duplex switched LAN architecture.

Regardless of the type of LAN technology employed in a network, the purpose of the LAN network is to allow information exchange among multiple stations. Each layer that supports data exchange among multiple stations must provides a means to uniquely identify the stations, which is achieved through the assignment of unique addresses. An Ethernet address (also called a MAC address) is typically 48 bits long. The first 24 bits constitute the OUI (Organizationally Unique Identifier) and are assigned by the IEEE Standard Association to each organization that builds network interfaces. MAC addresses are usually written in hexadecimal format (every 4 bits are a hex character). The example of the IFES 100 described herein network interfaces have OUI=00:06:CF, and a MAC address has the form 00:06:CF:hh:hh:hh. However, any suitable format for the interfaces and MAC address can be used.

Figure 13:
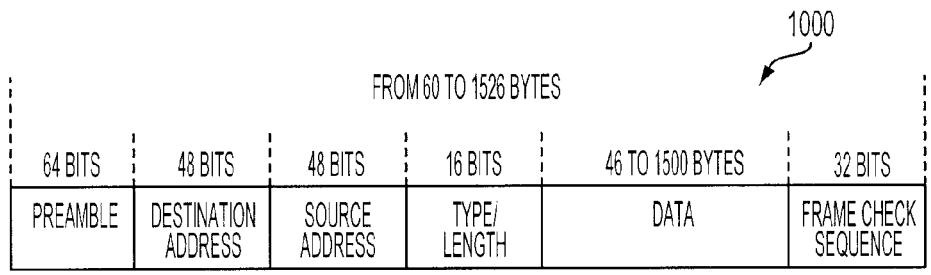
FIG. 13 is a data structure diagram illustrating an example of a possible format for a frame transmitted in the IFES shown in FIG. 1.
Figure 14:
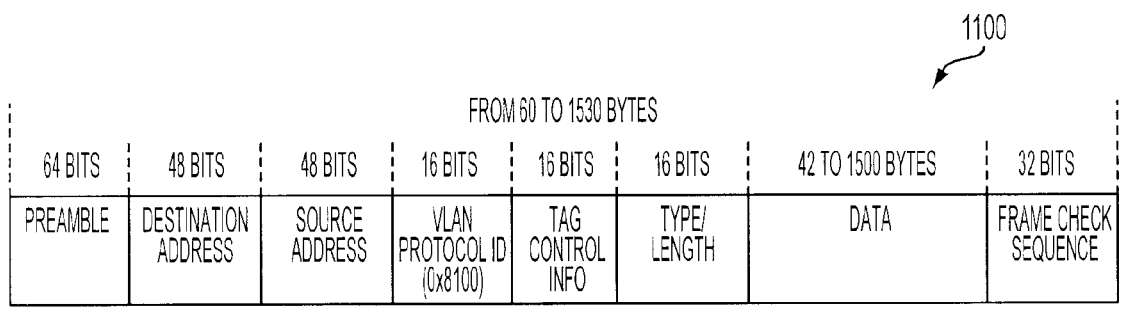
FIG. 14 is data structure diagram illustrating another example of a possible format for a frame transmitted in the IFES shown in FIG. 1.

The information distributed through an Ethernet, and hence the IFES 100, is formatted in frames. The frame format is defined in IEEE 802.3, and in this example, can have two forms, namely, frame 1000 as shown in FIG. 13 and frame 1100 as shown in FIG. 14. However, any other suitable frame format can be used. The format for frame 1100 is suitable for use in conjunction with VLAN-aware switches as defined in IEEE Standard 802.1Q. In both frames 1000 and 1100, the maximum length of the data encapsulated in the frame (IP packet) is 1500 bytes, which is the MTU (Maximum Transmission Unit) for a typical Ethernet network. However, the IFES 100 naturally can be modified to accommodate frames of different lengths and configurations.

Figure 12:
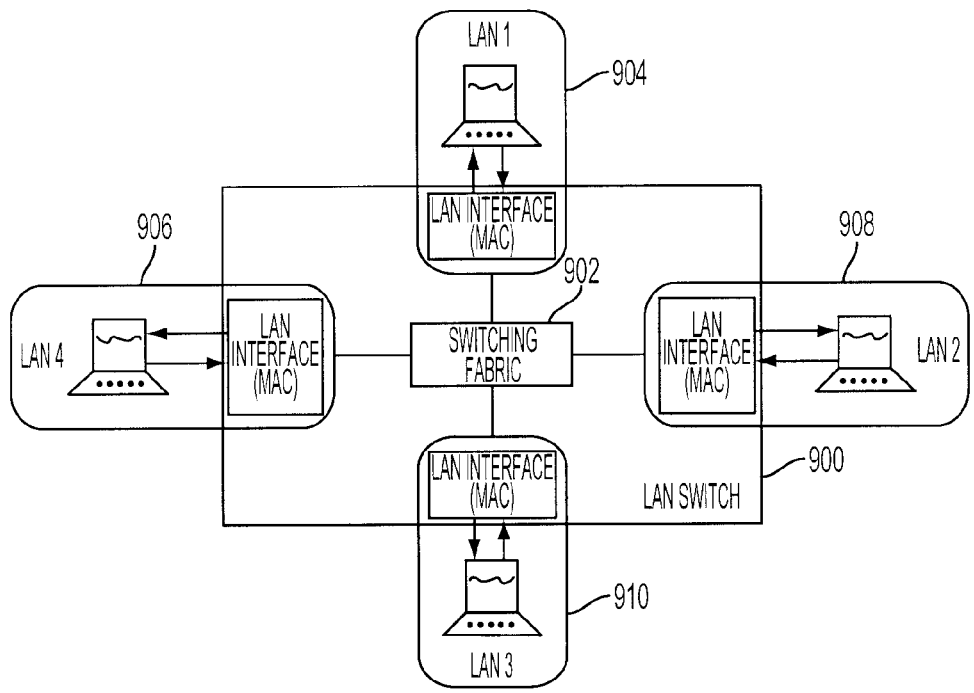
FIG. 12 is a conceptual pictorial/block diagram illustrating an example of a LAN that can be employed in the IFES shown in FIG. 1.
Figure 15:
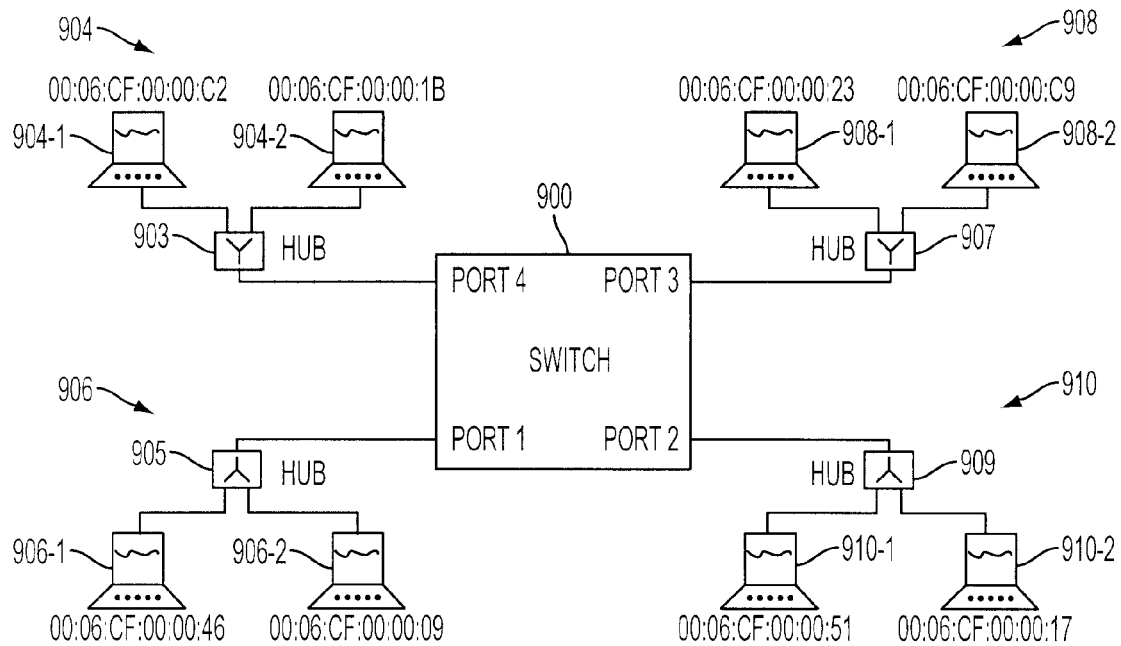
FIG. 15 is a conceptual pictorial/block diagram illustrating further details of the LAN shown in FIG. 12.

FIG. 15 is a more detailed conceptual view of the LAN arrangement shown in FIG. 12. In this example, switch 900 has four ports, and each LAN includes two stations. For example, LAN 904 includes stations 904-1 and 904-2 coupled to switch 900 by a hub 903, LAN 906 includes stations 906-1 and 906-2 coupled to switch 900 by a hub 905, LAN 908 includes stations 908-1 and 908-2 coupled to switch 900 by a hub 907, and LAN 910 includes stations 910-1 and 910-2 coupled to switch 900 by a hub 909. Each station has a unique MAC address, and switch 900 is able to move a frame received on one port to one or more another ports, based on whether the frame is transmitted as a unicast, multicast, or broadcast. The switch 900 knows through which port each station can be reached based on information stored in an address table as shown, for example, in Table 6 below:

TABLE 6

Address Table
Address Table

| Address | port |
|---|---|
| 00:06:CF:00:00:09 | 1 |
| 00:06:CF:00:00:C2 | 4 |
| 00:06:CF:00:00:23 | 3 |
| 00:06:CF:00:00:46 | 1 |
| 00:06:CF:00:00:51 | 2 |
| 00:06:CF:00:00:C9 | 3 |
| 00:06:CF:00:00:17 | 2 |
| 00:06:CF:00:00:1B | 4 |

As can be appreciated by one skilled in the art, a LAN switch, such as switch 900, operates in promiscuous mode, meaning that the switch 900 receives every frame on every port, regardless of the destination address of the frame. On the contrary, an end station (e.g., station 904-1, 904-1, etc.) attempts to receive only those frames whose destination address matches its own. For a unicast operation, when a frame is received on any port, the switch 900 extracts the destination address from the frame, looks the destination up in the address table, and determines the port to which that address maps. If the port on which the frame is received is the same port where the target destination resides, the switch 900 can simply discard the frame (i.e., switches do not send frames back to their origin).

For example, if station 906-1 having a MAC address of 00:06:CF:00:00:46 sends a frame to station 910-2 having a MAC address of 00:06:CF:00:00:17, the switch 900 will receive the frame on port 1 in this example and look up the station having the MAC address 00:06:CF:00:00:17 in the address table. The table indicates that the target destination is reachable through port 2. In order for the destination station to 910-2 receive the frame, the switch 900 forward the frame onto port 2. The forwarded frame still has the source address of the sending station 906-1, and therefore, the receiving station 910-2 is unaware of the switch's presence or, in other words, the switch 900 is transparent.

It should also be noted that proper operation of the switch 900 depends on the use of unique addresses. If two or more stations ever had the same address, it would not be possible to build an unambiguous address table, and the switch could not make the correct forward decision. Also, if the destination address is not in the table, or if the destination is a multicast or broadcast address, then typically the switch 900 forwards the frame to all ports except the port of arrival, which is commonly referred to as "flooding".

In general, the address table can be created dynamically by the switch 900 during normal operation. The switch 900 can also perform a table lookup for an entry corresponding to the source address of the received frame, indicating the station that sent the frame. If an entry is not found, that is, the switch 900 has not heard from this station previously, the switch 900 creates a table entry for this newly-learned address, with the port mapping indicating the port on which the frame arrived. If an entry is already in the table, the port mapping is updated to reflect the port on which the latest frame arrived, which allows the switch 900 to properly map stations that have moved from one segment to another. Over time, as stations send frames, the switch 900 will learn the address-to-port mapping for all active stations.

As can be appreciated from the above, if a switch 900 continued to add learned addresses to the table and never removed them, the table could become very large and the lookup operation would take very long and thus reduce the switch general performance. Also, if a station moves from one port to another, the information in the address table would be wrong for that station. Accordingly, and as discussed in more detail below, the switch 900 can age entries out of the address table when a station has not been heard from for some period of time. Thus, when the switch 900 performs the table lookup for the source address, the switch 900 not only makes a new entry or updates an existing entry, but also flags the entry as being active. On a regular basis, the switch 900 checks the table for stale entries, which are entries that have not been flagged as active for some time, and removes them from the table. Once a station entry is aged out, further communications to that station will be made by flooding, because the station address is now unknown. However, as soon as a station sends a new frame into the switch 900, the station's source address will be learned again and entered in the address table.

Figure 16:
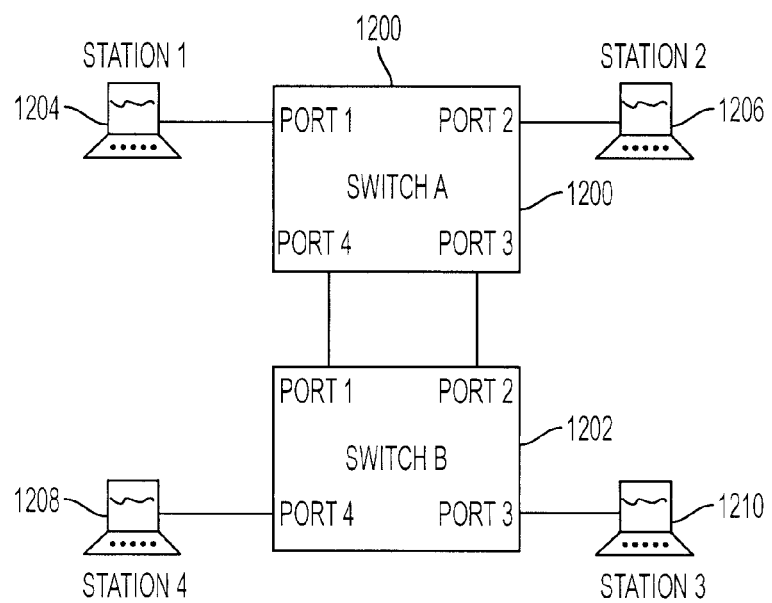
FIG. 16 is a conceptual pictorial/block diagram illustrating an example of another LAN that can be employed in the IFES shown in FIG. 1.

As can be appreciated by one skilled in the art, despite the use of an address table, one of the main problems that can occur in a LAN is the existence of Ethernet loops. An example of the occurrence of an Ethernet loop will now be explained with regard to FIG. 16 that illustrates a LAN having two switches 1200 and 1202, and four stations 1204, 1206, 1208 and 1210, similar to the stations and switch described above with regard to FIG. 15. If station 1204 sends a frame to a multicast or broadcast address, switch 1200 will flood all its ports and therefore, switch 1202 will receive the multicast/broadcast frame on ports 1 and 2. Switch 1202 will therefore flood the frame received on port 1 to all of its ports, and will also flood the frame received on port 2 to all of its ports. The multicast/broadcast frame sent by switch 1202 will be received by switch 1200 on ports 3 and 4. Switch 1200 will thus flood the frame received on port 3 to all ports, and flood the frame received on port 4 to all ports. Therefore, switch 1202 will receive the multicast/broadcast frame on ports 1 and 2 and the cycle will continue forever because the multicast/broadcast frame will keeps going around in a loop, getting repeated with each revolution. The same situation would occur with unicast messages if the switches' address tables are not complete.

As discussed in more detail below, virtual LANs (VLAN) can be used to eliminate the Ethernet loop problem in the IFES 100. VLANs also reduce the size of the broadcast domains, and thus reduce the number of broadcast packets received by an SVDU 114, which is especially sensitive to excessive external traffic while receiving video streams.

As understood by one skilled in the art, if a LAN is defined as a set of stations that are able to communicate transparently at the data link layer, then a VLAN is a proper subset of the LAN. A VLAN comprises a set of stations defined by the VLAN association rules in effect, together with the links and switches needed to interconnect those stations. In principle a station may be a member of multiple VLANs, depending on the VLAN association rules, the capabilities of the stations and switches deployed, and the nature of the protocols and applications operating within the station. From the perspective of the VLAN-aware devices, frames belong to a VLAN, and not stations, protocols, or applications, and a device associates each frame with a given VLAN on a frame-by-frame basis and makes decision (e.g. frame forwarding) based in part on that association. Depending on the rules in place, frames transmitted by a given station or switch may all be classified into the same VLAN or into different VLANs. That is, a station or switch does not belong to a VLAN, but its frames do, and any given frame is associated with only one VLAN. Depending on the arrangement of the IFES 100, a station may be a member of multiple VLANs, but the mapping of frame to VLAN is unambiguous.

The basic mechanism underlying VLAN operation is VLAN tagging and the corresponding VLAN association rules. The following describes two examples of methods for identifying the VLAN membership of a given frame.

One method includes the operations of parsing the frame and applying membership rules, and is referred to as "implicit tagging" and usually implemented by edge switches. An implicit tagged frame is a regular frame, and a VLAN-aware switch uses a rule or set of rules to determine the VLAN to which the frame belongs. Various VLAN-mapping rules have been implemented in commercial products, and from the simplest to the most complex, they can be classified as: Port-based, MAC-address based, Protocol-based, IP subnet-based, and Application-based. Except for Port-based mapping, the switch parses each frame and determines the associated VLAN based on the value of a specific field (e.g., MAC address, Protocol field, IP source address, higher layer fields). The IFES 100 described herein employs Port-based mapping, which is the simplest implicit mapping rule. However, the IFES 100 can alternatively be configured to employ any of the other types of mapping. According to Port-based mapping, a frame is assigned to a VLAN (referred to as the "default VLAN") based on the switch port on which the frame arrives, and no parsing of the frame is necessary.

Alternatively, the method of providing an explicit VLAN identifier within the frame itself is known as "explicit tagging" or simply "tagging." In this process, a VLAN-aware end station or switch declares the VLAN association through the use of the tag field carried within the frame. VLAN tags are applied by a VLAN-aware device, which may be a VLAN-aware end station sending natively-tagged frames (as supported by the station's operating system), or an edge switch that receives untagged frames, applies the VLAN association rules based on the implicit tagging mechanism explained above, and forwards the frame with a tag.

The characteristics of a VLAN-aware switch are defined in IEEE Standard 802.1Q. An 802.1Q VLAN tag in this example comprises two elements as shown in frame 1100 of FIG. 14. The VLAN Protocol Identifier (VPID) field identifies the frame as being VLAN tagged and is used to differentiate tagged frames from untagged frames. In this example, the VPID is a 2-byte field with a value of 0x8100, and indicates that the next 2 bytes in the frame contain the Tag Control Information. On Ethernet LAN, the VPID is used as a protocol type.

Figure 17:
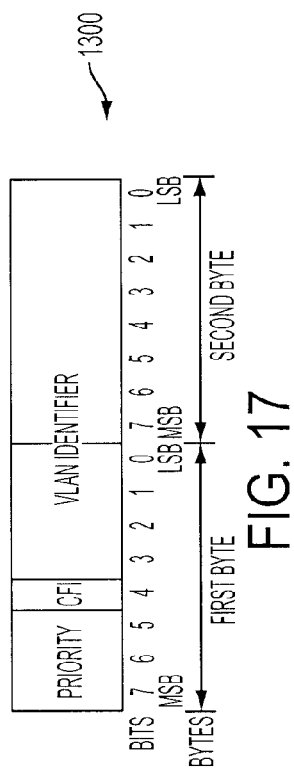
FIG. 17 is a conceptual data structure diagram of a tag control information field of a VLAN tag that can be used in the IFES 100 shown in FIG. 1.

An example of the Tag Control Information (TCI) field is shown in FIG. 17 as TCI 1300 that comprises essential ingredients of the VLAN tag. In this example, the first three bits are priority bits that are used to support the priority function defined in the standard IEEE 802.1p and are typically not used for VLAN operation. The Canonical Format Indicator (CFI) bit refers to the bit-ordering (e.g., Little or Big Endian) of embedded MAC addresses and to the use of Source Routing. Typically, in the IFES 100 in this example, the CFI is set to zero, meaning that source routing is not used, and embedded MAC addresses are in canonical (e.g., Little Endian) form. The VLAN Identifier (VID) is the 12-bit field that identifies a given VLAN. There are theoretically 4,096 possible values, but two are reserved (all zeros and all ones) in this example. The value of all zeros indicates a priority tag and therefore, the frame is not used for VLAN operation and a VLAN-aware switch would consider a frame with a tag of all zero as an untagged frame. The value of all ones indicates that the frame is reserved and unused.

Figure 18:
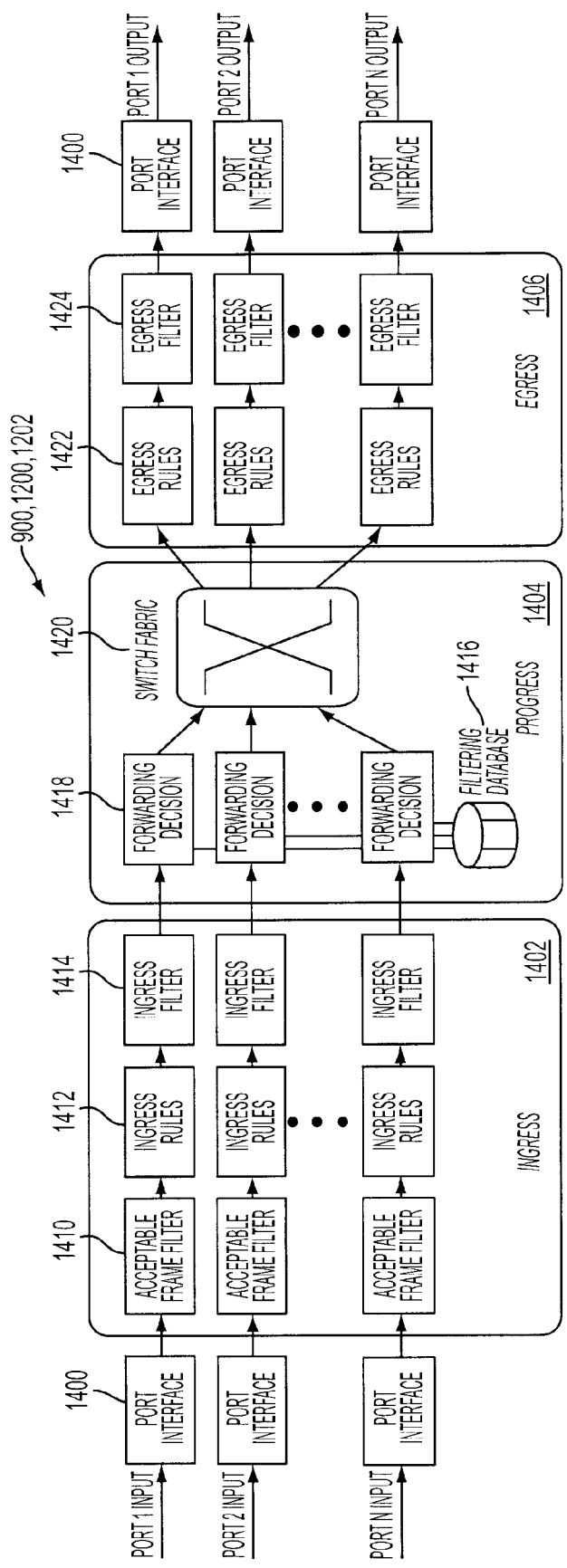
FIG. 18 is a conceptual block diagram depicting a model of an example of the operational flow of frames through a VLAN-aware switch that can be employed in the IFES shown in FIG. 1.

FIG. 18 is a conceptual block diagram depicting a model of an example of the operational flow of frames through a VLAN-aware switch, such as a switches 900, 1200 or 1202 discussed above, based on IEEE 802.1Q standard. For purposes of example, this description will refer to the switch as switch 900. As discussed above, a switch 900 comprises some number of physical port interfaces 1400 that can be used both to receive and transmit frames. A VLAN-aware switch receives frames and decides, on a frame-by-frame basis, onto which ports, if any, to forward the frame, and whether forwarded frames should be transmitted in tagged or untagged format. The switch 900 maintains state information for each VLAN that indicates which ports attach to LAN segments that are needed to reach members of that VLAN. This set of ports, known as the member set, is determined by the VLAN association rules in effect. Ports in the member set for a given VLAN can be expected to receive and transmit frames belonging to that VLAN, and ports not in the member set should generally not be receiving and/or transmitting frames for that VLAN.

For each frame received from a physical port 1400, the switch 900 performs a three-stage process comprising a set of ingress 1402, progress 1404, and egress 1406 operations.

The ingress process 1402 takes received frames from a physical port 1400 and performs three operations, namely, an Acceptable Frame Filter operation 1410, an Ingress Rules operation 1412, and an optional Ingress Filter operation 1414. The Acceptable Frame Filter operation 1410 determines if untagged frames should be passed to next module (the Ingress Rules module) or should be blocked and discarded. Tagged frames are passed to next module. The Ingress Rules module operation 1412 applies the VLAN association rules to received frames. Each frame is mapped to one VLAN in this module. The VLAN association rules are arbitrary, based on the desired application behavior and the capabilities of a given product (e.g., most switches support only a limited set of possible ingress rules). If the received frame contains a VLAN tag, the VLAN identifier in the tag determines the VLAN association, which is the frame is assigned to the VLAN indicated in the tag, and no other ingress rules need to be applied. If the frame is untagged, the VLAN association rules are applied as described above with regard to the implicit tagging process. The Ingress Filter operation 1414 can be configured to discard any frames associated with a VLAN for which that port is not in the member set. Enabling this filter provides a validation check on incoming frames, and frames will be passed to next module when they properly belonged on the LAN segment on which they were received from the perspective of the switch applying the filter. If the Ingress Filter is disabled, so-called asymmetrical VLANs can be created in which frames can be received on certain ports but not sent out those same ports.

As discussed above, a switch 900 makes frame forwarding decisions based on the contents of its filtering database 1416. The Progress process 1404 comprises the forwarding mechanism 1418, which is the mechanism that maintains the database 1416, the database 1416 itself, and the switching fabric 1420. In VLAN-aware switches, the mapping of frames to output ports is a function of both the destination address and the VLAN mapping for each frame. The filtering database 1416 of a VLAN-aware switch incorporates all the features available in a VLAN-unaware switch, but in addition provides a mechanism to learn the port member sets for each VLAN, which is the mapping between ports and VLANs. Address entries in the filtering database 1416 can reflect either multicast or unicast destinations. Unicast destinations are learned by inspection of source addresses of an incoming packet. In a VLAN-aware switch, multicast address entries in the database are associated with a VLAN the same as unicast entries, that is, multicast propagation can be controlled on a per-VLAN basis. IEEE Standard 802.1Q supports unicast address learning in two ways. For example, specific groups of VLANs can be identified as a shared VLAN Learning (SVL) set where any address-to-port mapping deduced by learning process will be learned simultaneously for all VLANs in the group, regardless of the VLAN association of the frame from which the address was learned. Alternatively, a group of VLANs can be identified as an Independent VLAN Learning (IVL) set, and the learning process will record address-to-port mapping within this set only for the specific VLAN associated with the received frame from which the address was learned. The IFES 100 described herein employs the IVL set, but naturally can be modified to employ the SVL set or any other suitable address learning methodology.

The Egress process 1406 makes the final decision with respect to whether and how to transmit frames through the output port. In this example, the Egress process 1406 comprises two operations, namely, an Egress Rules module 1420 and an Egress Filter 1422. The Egress Rules module 1422 determines if the frame will be sent tagged or untagged, which mainly depends on the capability of the receiving station/switch, that is, whether they are VLAN-aware or not. The Egress Filter 1424 is the last module that can discard a frame before the frame is sent out a port 1400. The Egress Filter 1424 generally operates in particular conditions that are not applicable to the IFES 100.

Details of an example of the IP used by the IFES 100 and embodiments of the present invention will now be described.

As can be appreciated by one skilled in the art, the Internet Protocol (IP) is designed for use in interconnected systems of packet-switched computer communication networks. IP provides for transmitting blocks of data called datagrams from sources to destinations. In general, IP also provides for fragmentation and reassembly of longer datagrams, if necessary. That is, a datagram can be longer than the MTU of the Layer 2 technology that is in charge of delivering the datagram, in which event the datagram is fragmented to fit the underlying MTU. This generally occurs when the there is more than one Layer 2 technology involved in the delivery, for example Token Ring and Ethernet. Each datagram fragment that is encapsulated in a frame is called a packet.

Figures 19, 20:
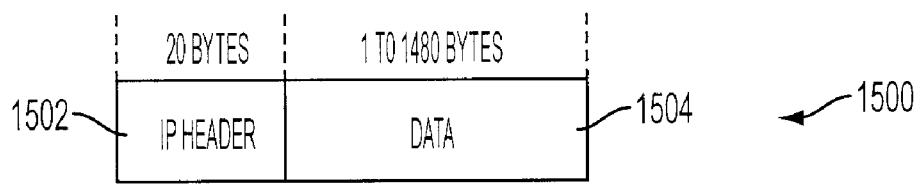
FIG. 19 is a conceptual data structure diagram of an IP packet that can be transmitted in the IFES as shown in FIG. 1.
FIG. 20 is a conceptual data structure diagram of an IP address format that can be used in the IFES as shown in FIG. 1.

As shown in FIG. 19, an IP packet 1500 (which can be similar to IP packet 612 described above with reference to FIG. 9) includes a header 1502 and data 1504. In this example, the IP header 1502 contains 12 fields. The last two fields contain the Source IP address and the Destination IP address. The IP address can be a 32 bit field and is usually written in decimal dotted notation (for example, 172.17.5.1). Each IP address typically includes two parts, with one part identifying the network and the other part identifying the host. The separation between the network part and the host part is defined by the subnet mask. A subnet mask is generally a 32-bit number that acts like a filter when applied to an IP address. A subnet mask is a series of '1' followed by a series of '0'. The number of is determines the network part in the IP address.

For example, in the IP address 1600 of FIG. 20, "172.17" is the network, and ".5.1" is the host. The size of the network, that is, the number of devices that can be used on a particular network, is a function of the number of bits that are used to identify the host portion of the address. In the example above, there are 16 bits allocated to the host part. Therefore, the 172.17 network allows for $2^{16}=65536$ possible host addresses. In practice, there are two reserved addresses, namely, the address with all '0' that identifies the network itself (172.17.0.0) and the address with all '1' that identifies the broadcast address (172.17.255.255). Hence the 172.17 net can have up to 65534 devices.

When there is a need to split a single network into multiple virtual sub-networks (i.e., a subnet), the bit pattern in use with the subnet mask 1602 can be changed to allow as many networks as required. For example, assuming that the 172.17 network is to be split into two smaller subnets, the subnet mask of the devices on the network so that they use 17 bits for the network part instead of 16 bits which is the default for that network. Table 7 below shows an example of all subnets that can be created from a Class B network, which is a network that has 16 bits in its subnet mask (e.g., 172.17.0.0 is a Class B network).

TABLE 7

An Example of Subnets for a Class B Network

| Subnet mask | Short notation | subnets per mask | Host bits | Hosts per subnet |
|---|---|---|---|---|
| 255.255.0.0 (Class B default) | /16 | 1 | 16 | 65534 |
| 255.255.128.0 | /17 | 2 | 15 | 32766 |
| 255.255.192.0 | /18 | 4 | 14 | 16382 |
| 255.255.224.0 | /19 | 8 | 13 | 8190 |
| 255.255.240.0 | /20 | 16 | 12 | 4094 |
| 255.255.248.0 | /21 | 32 | 11 | 2046 |
| 255.255.252.0 | /22 | 64 | 10 | 1022 |
| 255.255.254.0 | /23 | 128 | 9 | 510 |
| 255.255.255.0 (Class C default) | /24 | 256 | 8 | 254 |
| 255.255.255.128 | /25 | 512 | 7 | 126 |
| 255.255.255.192 | /26 | 1024 | 6 | 62 |
| 255.255.255.224 | /27 | 2048 | 5 | 30 |
| 255.255.255.240 | /28 | 4096 | 4 | 14 |
| 255.255.255.248 | /29 | 8192 | 3 | 6 |
| 255.255.255.252 | /30 | 16384 | 2 | 2 |

As an example, it can be seen that from a 172.17.0.0/16 network, 4 subnets/18 can be created, which would be:

| | |
|---|---|
| 172.17.0.0/18 | (from 172.17.0.0 to 172.17.63.255) |
| 172.17.64.0/18 | (from 172.17.64.0 to 172.17.127.255) |
| 172.17.128.0/18 | (from 172.17.128.0 to 172.17.191.255) |
| 172.17.192.0/18 | (from 172.17.192.0 to 172.255.255) |

In addition, Table 8 below illustrates examples of IP addresses that can be used for head-end servers and line replaceable units (LRUs) such as AVC-Ds 102, QSEBs 112 and so on.

TABLE 8

Examples of IP Addresses for LRUs and Services

| | | Ports | Protocol |
|---|---|---|---|
| IFE Range | 172.17.0.0-172.17.255.254 | | |
| Head-End Servers | 172.17.0.1-172.17.7.255.254 | | |
| Low Latency PA FPGA Non-IFE | 172.17.0.255 | | Reserved, transmit only |
| Latecore Digital Camera | 172.17.0.16 | 162 | SNMP |

As discussed above, a VLAN such as that embodied by IFES 100 can perform unicast services is for sending a packet to a single destination or service. The destination includes a host name, and the host name is resolved into an IP address. The network stack will first resolve the host name to an IP address. This is accomplished by looking either in the host file or by asking the DNS server, depending upon "order" setting in /etc/hosts.conf. Once the IP address is known, the network stack can perform a logical AND on the destination IP address with its own network mask. If the result is zero, the stack knows that the IP address is on the local network and looks in its ARP cache for the Ethernet address for that IP address. If the IP address is in the ARP cache and it is still valid, the host will send the IP packet to the found MAC address. If the IP address is found but stale, the host will first do a unicast ARP to the last stale MAC address to request the MAC for the IP it is trying to resolve. If the ARP entry is invalid or does not exist, the host does a broadcast ARP request asking all hosts on the network for the MAC address of the IP it is trying to resolve. If the result is not zero, the host resolves the MAC address of the IP address of the router for that subnet or the default router and uses that MAC address to send the IP packet.

In addition, multicast services, such as those discussed above, that can be performed by the IFES 100 use group IP addresses to send the same packet to a groups of hosts that are either preconfigured to receive the group IP addresses or have joined the group IP addresses. This service is used to send special packets to a group of hosts, but not necessarily to all hosts. The sending hosts sends the packets once, and the multicast router and multicast enabled switches duplicate the packets to all the ports that have hosts that are part of that multicast group. Multicast is also used to send a heartbeat signal, as discussed in more detail below, to all devices without the heartbeat signal looping back the redundant paths back to the head-end equipment, and also to prevent the heartbeat signal from being received twice by the seat-end devices, which would be the case if the heartbeat signal were broadcasted. Multicast is also used to send digital PA to all the QSEBs 112 and not to other hosts on the IFES 100. In addition, multicast is used for digital broadcast services where a single audio or video stream can be received by multiple passengers SVDUs 114 that want to listen to or view that specific content. For hosts to join a digital broadcast stream, they send an Internet Group Management Protocol (IGMP) join (membership report) as defined, for example, in RFC 3376.

It should also be noted that with regard to the IGMP, in the IFES 100 routers are in the host systems and the distribution switches do not perform layer 3 routing. Rather, the multicast router will provide layer 3 routing for external multicast services, and distribution of multicast packets in the IFES 100 can be provided at layer 2 by enabling multicast MAC addresses on the switch ports where members of the multicast groups can be reached. This enabling can be accomplished statically using, for example, the Broadcom Multiport Vector function for digital PA and heartbeat. Also, the distribution Ethernet switches in the IFES 100 support IGMP snooping, which allows the switch processors to receive the IGMP messages by sending them to the management port. When switch management processor receives the IGMP message it also receives the information about which port sent the IGMP message. The processor then configures the port requesting a new stream (e.g., an IGMP membership report), or by leaving a stream (e.g., IGMP leave report) to add or remove the multicast MAC address to the switch's forwarding table for requesting port. The switch management processor also forwards IGMP queries to the ports receiving multicast streams. The IGMP snooping and forwarding in the IFES 100 can be implemented per RFC 4541.

In the case of broadcast services via multicast that are being sourced by an AVC-D 102, for example, the AVC-D 102 does not require a Multicast Router program (MRouteD) to stream multicast packets which could impose a large computational load on the AVC-D processor that can negatively impact performance. However, because the IGMP installed multicast port assignments are subject to aging, the AVC-D 102 provides group specific IGMP queries for each group that it is streaming to maintain the group addresses in the forwarding tables of the IFE Ethernet switches. This function can be included, for example, in the video broadcast application that setups up the broadcast channels based upon input from the ICMT (Crew).

Table 9 below illustrates and example of the multicast group addresses that can be used in the IFES 100.

TABLE 9

Examples of Multicast Group Address Assignments

| | |
|---|---|
| IFE Range | 239.192.0.0-239.192.55.255 |
| CBB Live TV to PEDS (WM 9) | 239.192.1.1-16 |
| A/V Broadcast Services | 239.192.16.0-239.192.31.255 |
| Digital Landscape Cameras | 239.192.32.0-239.192.32.255 |
| Channel 1 (FWD) | 239.192.32.0 |
| Channel 1 (FWD) | 239.192.32.1 |
| Channel 1 (FWD) | 239.192.32.2 |
| Reserved | 239.192.33.0.0-239.192.55.253 |
| Digital PA | 239.192.55.254 |
| Broadcast Data (HeartBeat) | 239.192.55.255 |
| Non-IFE | 239.192.56.0-239.192.63.255 |
| CBB LiveTB MPEG | 239.192.56.101-239.192.56.116 |
| Airbus Data Diode | 224.244.0.71 |

As indicated in Table 5, the range of addresses 239.192.0.0-239.192.55.255 is for IFE uses and the range 239.192.56.0-39.192.63.255 is for non-IFE uses.

The IFES 100 also uses Dynamic Host Configuration Protocol (DHCP) which is a client-server protocol that allows clients to be assigned IP addresses from a shared pool managed by a DHCP server. Typically, DHCP consists of two major components: an address allocation mechanism, and a protocol that allows clients to request, and servers to provide, configuration information.

Figure 21:
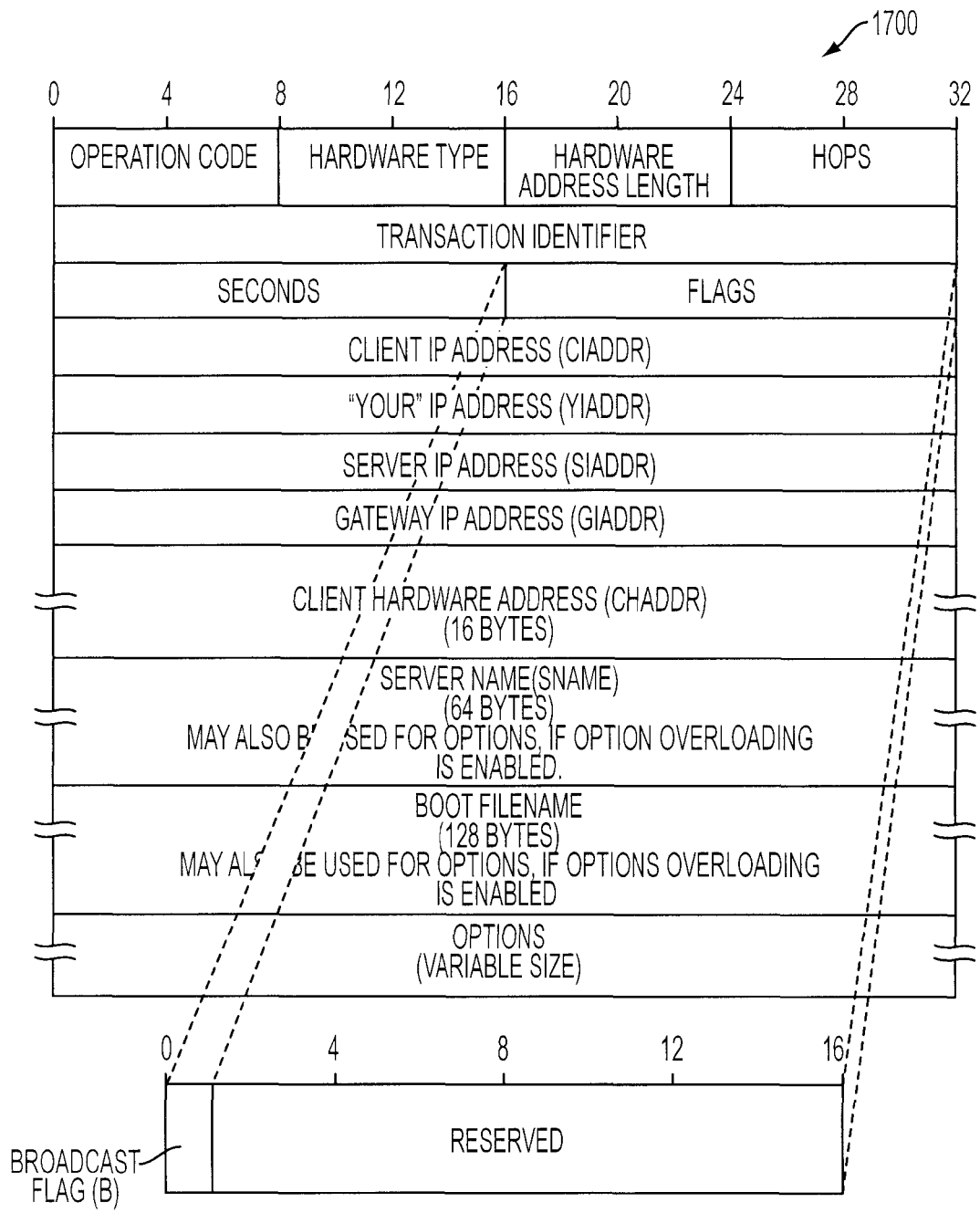
FIG. 21 is a data structure diagram illustrating an example of a Dynamic Host Configuration Protocol (DHCP) message format that can be used in the IFES shown in FIG. 1.

Table 10 below, and the message 1700 shown in FIG. 21, illustrate an example of DHCP message format.

TABLE 10

An Example of DHCP Message Format

| Field Name | Size (bytes) | Description |
|---|---|---|
| Op | 1 | Operation Code: Specifies the general type of message. A value of 1 indicates a request message, while a value of 2 is a reply message. This code represents the general category of the DHCP message; a client sending a request to a server uses an Op code of 1, while a server replying uses a code of 2. So, for example, a DHCPREQUEST would be a request, while a DHCPACK or DHCPNAK is a reply. The actual specific type of DHCP message is encoded using the DHCP Message Type option. |
| HType | 1 | Hardware Type: this field specifies the type of hardware used for the local network. The value for IEEE 802 networks (which includes Ethernet) is 6. |
| HLen | 1 | Hardware Address Length: Specifies how long hardware addresses are in this message. For Ethernet or other networks using IEEE 802 MAC addresses, the value is 6. |
| Hops | 1 | Hops: Set to 0 by a client before transmitting a request and used by relay agents to control the forwarding of DHCP messages. |
| XID | 4 | Transaction Identifier: A 32-bit identification field generated by the client, to allow it to match up the request with replies received from DHCP servers. |
| Secs | 2 | Seconds: it is defined as the number of seconds elapsed since a client began an attempt to acquire or renew a lease. This may be used by a busy DHCP server to prioritize replies when multiple client requests are outstanding. |
| Flags | 2 | Flags: currently only one flag (one bit) is used, the broadcast (B) flag. A client that does not |

TABLE 10-continued

An Example of DHCP Message Format

| Field Name | Size (bytes) | Description |
|---|---|---|
| | | know its own IP address at the time it sends its request sets this flag to 1. This serves as an immediate indicator to the DHCP server or relay agent receiving the request that it should send the replay back by broadcast. |
| CIAddr | 4 | Client IP Address: The client puts its own current IP address in this field if and only if it has a valid IP address while in the BOUND, RENEWING or REBINDING states; otherwise, it sets the field to 0. The client can only use this field when its address is actually valid and usable, not during the process of acquiring an address. Specifically, the client does not use this field to request a particular IP address in a lease; it uses the Requested IP Address DHCP option. |
| YIAddr | 4 | "Your" IP Address: The IP address that the server is assigning to the client. |
| SIAddr | 4 | Server IP Address: it is the address of the server that the client should use for the next step in the bootstrap process, which may or may not be the server sending this reply. The sending server includes its own IP address in the Server Identifier DHCP option. |
| GIAddr | 4 | Gateway IP Address: This field is used to route messages when DHCP relay agents are involved to facilitate the communication of DHCP requests and replies between a client and a server on different subnets or networks. This field is not used by clients and does not represent the server giving the client the address of a default router (that's done using the Router DHCP option). |
| CHAddr | 16 | Client Hardware Address: The hardware (layer two) address of the client, which is used for identification and communication. |
| SName | 64 | Server Name: The server sending a DHCPOFFER or DHCPACK message may optionally put its name in this field. This can be a simple text "nickname" or a fully-qualified DNS domain name. This field may also be used to carry DHCP options, using the "option overload" feature, indicated by the value of the DHCP Option Overload option. |
| File | 128 | Boot Filename: Optionally used by a client to request a particular type of boot file in a DHCPDISCOVER message. Used by a server in a DHCPOFFER to fully specify a boot file directory path and filename. This field may also be used to carry DHCP options, using the "option overload" feature, indicated by the value of the DHCP Option Overload option. |
| Options | Variable | Options: Holds DHCP options, including several parameters required for basic DHCP operation. This field may be used by both client and server. |

As indicated above, the DHCP Options field can contain an arbitrary number of parameters to be sent from the server to the client device, such as an SVDU 114. Some of these include pieces of data that are actually mandatory for the successful operation of DHCP. There can be several dozen DHCP options, which are divided into functional categories.

The DHCP Server in the IFES 100 in this example has a VLAN interface configured for every seat-end VLAN, and has an address on each one of the VLAN interfaces. To the Linux operating system, VLAN interfaces appear like any physical interface, and the routing of traffic based upon network address attached to interfaces is no different than if they were physical interfaces. When the DHCP server receives a request for an address, it will automatically provide an address in the subnet from which the request came. Since each seat column provides a different VLAN tag and each VLAN is associated with a different subnet, the DHCP server provides IP addresses to the seat-end requester from the scope of addresses defined in the dhcpd.conf file for each subnet. By providing IP addresses based upon VLAN, the IP routing is extended to the layer 2 switched network.

The DHCP Server dynamically allocates an administratively set or pool (usually a range or set of ranges) of IP addresses that are available for use. Each client, such as an SVDU 114, that is configured to use DHCP contacts the server (e.g., a server in an AVC-D 102) when the client needs an IP address. The server keeps track of which IP addresses are already assigned, and leases one of the free addresses from the pool to the client. The server decides the amount of time that the lease will last, and when the time expires, the client either requests permission to keep using the address (renewing the lease) or obtains a new address.

Many clients generally will request addresses from this pool. Most of these clients are viewed as "equals" by the DHCP server, and therefore do not require any particular address assignment. Accordingly, most of the information stored with each of the addresses in a pool may be the same except for the address number itself and it is not necessary to specify each address and its parameters individually. Instead, a range of addresses is normally handled as a single group defined for a particular network or subnet, and these addresses are not given any particular name in the DHCP standards, but are commonly referred to as ranges or scopes. Instead of putting all of its addresses (except excluded ones) in a single scope, a server may use multiple scopes to support more than one subnet on a server. Multiple scopes are also commonly used when multiple DHCP servers are used to serve the same clients. The DHCP server can further store parameters that are client specific in some sort of a database, and index them using a particular client identifier. The default identifier can include the client's hardware (MAC) address. Thus, when a server receives a request from a particular subnet, the server can use the client's hardware address in the request to look up client-specific parameters and return those parameters to the client.

Communication of configuration parameters between DHCP clients and servers can be accomplished using DHCP options. A number of standard options are defined for DHCP. In addition to the IP address, subnet mask and lease length, the DHCP server can also assign domain name server and routers, and additional applications as deemed appropriate The DHCP standard also typically uses a Finite State Machine (FSM) to describe the lease life cycle from the perspective of a DHCP client. The client begins in an initial INIT state where it has no lease, and then transitions through various states as it acquires, renews, rebinds and/or releases its IP address. The FSM also indicates what message exchanges occur between the server and client at various stages.

Figure 22:
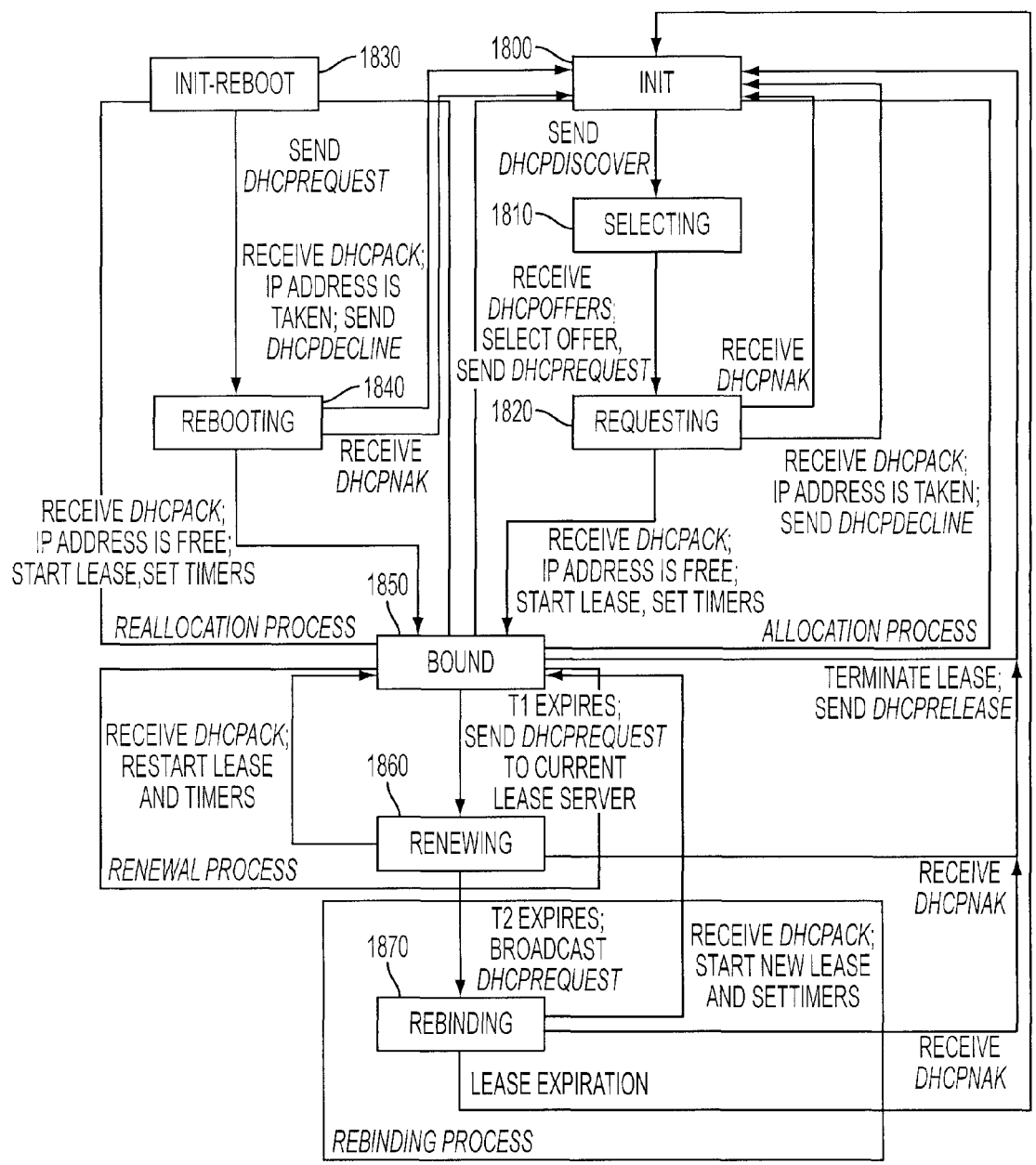
FIG. 22 is a flow diagram illustrating an example for the different states that a client device in the IFES shown in FIG. 1 can experience with regard to IP address leasing.

Table 7 below indicates an example of the different states that a client can experience with regard to IP address leasing. An example of the flow of operations shown in Table 11 is also illustrated in FIG. 22.

TABLE 11

Examples of States of a Client

| State | State Description | Event and Transition |
|---|---|---|
| INIT | Step 1800 is the initialization state, where a client begins the process of acquiring a lease. It also returns here when a lease ends, or when a lease negotiation fails. | Client Sends DHCPDISCOVER: The client creates a DHCPDISCOVER message and broadcasts it to try to find a DHCP server. It transitions to the SELECTING state. |
| SELECTING | In step 1810, the client is waiting to receive DHCPOFFER messages from one or more DHCP servers, so it can choose one. | Client receives offers, selects preferred offer, and sends DHCPREQUEST: The client chooses one of the offers it has been sent, and broadcasts a DHCPREQUEST message to tell DHCP servers what its choice was. It transitions to the REQUESTING state. |
| REQUESTING | In step 1820, the client is waiting to hear back from the server to which it sent its request. | Client receives DHCPACK, successfully checks that IP address is free: The client receives a DHCPACK message from its chosen server, confirming that it can have the lease that was offered. It checks to ensure that address is not already used, and assuming it is not, records the parameters the server sent it, sets the lease timers T1 and T2, and transitions to the BOUND state.<br>Client receives DHCPACK, but IP address is in use: the client receives a DHCPACK message from its chosen server, confirming that it can have the lease that was offered. However, it checks and finds the address already in use. It sends a unicast DHCPDECLINE message back to the server, and returns to the INIT state.<br>Client receives DHCPNAK: The client receives a DHCPNAK message from its chosen server, which means the server has withdrawn its offer. The client returns to the INIT state. |
| INIT-REBOOT | When a client that already has a valid lease starts up after a power-down or reboot, it starts in step 1830 instead of the INIT state. | Client sends DHCPREQUEST: The client sends a broadcast DHCPREQUEST message to attempt to verify its lease and re-obtain its configuration parameters. It then transitions to the REBOOTING state to wait for a response. If the server does not respond, the client will use the old address until the lease expires. |
| REBOOTING | A client that has rebooted with an assigned address is waiting in step 1840 for a confirming reply from a server. | Client receives DHCPACK, successfully checks that IP address is free: The client receives a DHCPACK message from the server that has its lease information, confirming that the lease is still valid. To be safe, the client checks anyway to ensure that the address is not already in use by some other device. Assuming it is not, the client records the parameters the server sent it and transitions to the BOUND state.<br>Client Receives DHCPACK, but IP address is in use: the client receives a DHCPACK message from the server that had its lease, confirming that the lease is still valid. However, the client checks and finds that while the client was offline, some other device has grabbed its leased IP address. The client sends a unicast DHCPDECLINE message back to the server, and returns to the INIT state to obtain a new lease.<br>Client Receives DHCPNAK: The client receives a DHCPNAK message from a server. This tells it that its current lease is no longer valid; for example, the client may have moved to a new network where it can no longer use the address in its present lease. The client returns to the INIT state. |
| BOUND | In step 1850, a client has a valid lease and is in its normal operating state. | Renewal timer (T1) expires: The client transitions to the RENEWING state, and asks for a lease renewal sending a unicast DHCPREQUEST message to its server.<br>Client terminates lease, sends DHCPRELEASE: The client decides to terminate the lease (due to user command, for example.) It sends a DHCPRELEASE message and returns to the INIT state. |

TABLE 11-continued

Examples of States of a Client

| State | State Description | Event and Transition |
|---|---|---|
| RENEWING | In step 1860, a client is trying to renew its lease. It regularly sends DHCPREQUEST messages with the server that gave it its current lease specified, and waits for a reply. | Client Receives DHCPACK: The client receives a DHCPACK reply to its DHCPREQUEST. Its lease is renewed; it restarts the T1 and T2 timers, and returns to the BOUND state. Client Receives DHCPNAK: The server has refused to renew the client's lease. The client goes to the INIT state to get a new lease. Rebinding Timer (T2) Expires: While attempting to renew its lease, the T2 timer expires, indicating that the renewal period has ended. The client transitions to the REBINDING state. |
| REBINDING | In step 1870, the client has failed to renew its lease with the server that originally granted it, and now seeks a lease extension with any server that can hear it. It periodically sends DHCPREQUEST messages with no server specified until it gets a reply or the lease ends. | Client Receives DHCPACK: Some server on the network has renewed the client's lease. The client binds to the new server granting the lease, restarts the T1 and T2 timers, and returns to the BOUND state. Client Receives DHCPNAK: A server on the network is specifically telling the client it needs to restart the leasing process. This may be the case if a new server is willing to grant the client a lease, but only with terms different than the client's current lease. The client goes to the INIT state. Lease Expires: The client receives no reply prior to the expiration of the lease. It goes back to the INIT state. |

It should further be noted that the DHCP protocol assumes that clients will normally broadcast messages, since the clients typically do not know the address of servers when they initiate contact. However, servers will typically send replies back unicast to the client. This can be done even before the client has an IP address, by sending the message at the link layer. That is, a client typically generates a message using the general DHCP message format. When a server replies to a client message, the server does not need generate the reply as a completely new message, but rather copies the client request, changes fields as appropriate, and sends the reply back to the client. A special transaction identifier (XID) is placed in the request and maintained in the reply, which allows a client know which reply goes with a particular request.

Also, DHCP uses UDP for transport due to the simplicity and support for broadcasts of this transport layer protocol. Clients usually will send requests by broadcast on the local network, to allow them to contact any available DHCP server. The exception to this is when a client is trying to renew a lease with a server that it already knows. For compatibility with BOOTP, DHCP can use the same well-known (reserved) UDP port number (e.g., number 67), for client requests to servers. DHCP servers can send their replies either broadcast to the special port number reserved for DHCP clients, or unicast using layer two. The DHCP standards specify that layer two delivery should be used when possible to avoid unnecessary broadcast traffic.

Further details of the configuration and operations of the IFES 100, and its use of DHCP and the formation of VLANs, will now be discussed.

The system and method according to an embodiment of the present invention enables an IFES 100 to assign to each LRU as many IP addresses as necessary to support all system services. Naturally, the number of IP addresses available per LRU in the IFES 100 configured as a "Class B" network as discussed above is constrained by the total number of IP addresses in a Class B network, and the schema used to assign these addresses.

As discussed above, each seat end LRU is part of one of more subnets. The subnets are used to segregate the network traffic and to maintain better control of the network performance. The head end LRUs, such as the AVC-Ds 102 and DSUs 104, can have virtual interfaces on different subnets, as necessary. In an IFES without redundant wiring, such as that shown in FIG. 4, only one IP address per seat end LRU can be used in order to support audio/video on demand (AVOD). In an IFES with redundant wiring, such as that shown in FIG. 1, two IP addresses per seat end LRU are used. As can be appreciated by one skilled in the art, other applications (e.g., laptop connectivity and in-seat browser) may require additional IP addresses outside of the IFES 100. These addresses can be assigned in the 172.16.0.0/16 or 172.18.0.0/16 networks, for example.

In the IFES 100 as shown in FIG. 1 (as well as the non-redundant configuration shown in FIG. 3), IP addresses are assigned to QSEBs 112 through the DHCP Protocol as discussed above. The DHCP server is located, for example, on AVC-D 102-1. A system with two AVC-Ds, such as IFES 100 having AVC-Ds 102-1 and 102-2, also has a redundant DHCP server on AVC-D 102-2.

As discussed above, all seat end LRUs (e.g., QSEBs 112) can be organized in seat columns, as shown in FIG. 4 which illustrates a seat column having a string of QSEBs/SVDUs/TPCUs directly connected to an ADB 108 output connector (this is the typical configuration for a B777 aircraft). FIG. 3, on the other hand, illustrates a seat column where an FDB 110-2 is used between an ADB 108-1 output and first QSEB 112 in the seat column (this is a typical Airbus configuration). It should also be noted that no redundant wiring between multiple FDBs 110 is installed, that is, all QSEBs 112 in the column can be serviced by only one ADB 108-1. FIG. 2 illustrates two columns (A and B) that can be employed, for example, in an Airbus installation (e.g., an Airbus A380) with redundancy wiring between FDBs 110-2 and 110-3. In this arrangement, even though there is no logical difference between the two columns and all LRUs will have 2 IP addresses in the same two subnets, columns A and B are viewed as being separated for purposes of this discussion.

Regardless of the configuration, the system and method according to an embodiment of the present invention enable the IFES 100 to assign the IP addresses in such a way so that all LRUs in a column will be part of the same subnet. For installations with redundant wiring, two IP addresses are assigned per LRU, such that all LRUs in paired columns will have IP addresses in the same two subnets. For example, if all LRUs in columns A and B of FIG. 2 are to be on subnets X and Y, each LRU will have an address on subnet X and an address on subnet Y.

The system and method according to an embodiment of the present invention further enable the DHCP server to know the seat column from which a DHCP request is coming. To achieve this, the ADB switch (e.g., ADB 108-1) tags any frames coming from a seat end LRU in its seat column with a VLAN ID. Each VLAN is associated with a subnet. The definition of VLANs and subnets is, in general, customer based, even though efforts can be made to keep the maximum commonality between different platforms. Also, the DHCP server (e.g., on AVC-D 102-1) has a virtual network interface on each subnet/VLAN.

Figure 23:
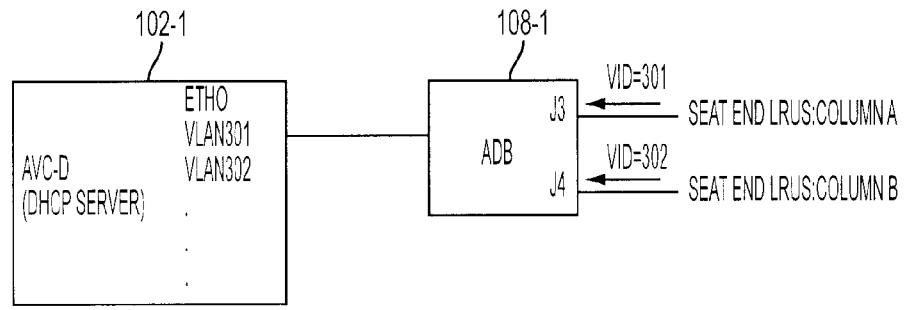
FIG. 23 is a conceptual block diagram illustrating an example of virtual interfacing that can occur in the IFES shown in FIG. 1.

FIG. 23 and the following discussion illustrate this concept. As shown in FIG. 23, the AVC-D 102-1 has multiple network interfaces, real (eth0) and virtual (vlan301, vlan302, etc). A broadcast DCHP message sent by a client in seat column A is encapsulated in a frame that gets tagged with VID 301 when entering the ADB 108-1. This frame remains tagged up to the AVC-D 102-1, where the tagged frame is received at interface vlan301. Interface vlan301 is associated with subnet X, therefore the DHCP server assigns an IP address in subnet X from interface vlan301.

For purposes of this example, it can be assumed that the seats in columns A and B shown in FIG. 2 are to be assigned with IP addresses in the subnets 172.17.8.0/23 and 172.17.208.0/23. AVC-D 102-1 has been configured with a virtual interface in the 172.17.8.0/23 subnet as follows:

```
vlan301   Link encap:Ethernet HWaddr 00:06:CF:00:00:D9
          inet addr: 172.17.9.253 Bcast: 172.17.9.255
          Mask: 255.255.254.0
``` and the DHCP configuration file has the configuration

```
Subnet 172.17.8.0 netmask 255.255.254.0 {
       range 172.17.8.1 to 172.17.9.248
       default-lease-time infinite
       max-lease-time infinite
       option broadcast - address 172.17.9.255
       option routers 172.17.9.249, 172.17.209.249
       }
Subnet 172.17.10.0 netmask 255.255.254.0 {
       range 172.17.10.1 to 172.17.11.248
       default-lease-time infinite
       max-lease-time infinite
       option broadcast - address 172.17.11.255
       option routers 172.17.11.249, 172.17.211.249
       }
.
.
<other subnet definitions>
.
.
```

Then, for each DHCP request received on interface vlan301, the DHCP server will identify the correct subnet section in the configuration file (subnet 172.17.8.0/23 in this example), and assign an IP address in the defined range (172.17.8.1 to 172.17.9.248 in this example). The secondary IP address is auto-assigned by each seat end host, and the value of the secondary address depends on the IP assignment schema and can be obtained using an algorithm or via system database.

It should also be noted that the DHCP server may receive two DHCP-DISCOVERY messages (on two separate interfaces) from the same device (e.g., the same QSEB 112), but this is handled seamlessly be the DHCP protocol itself The DHCP server will offer an address from each interface and it is up to the client to pick which IP address it wants to use. The client will request which one it wants to use and the DHCP server will make sure to only acknowledge one of the addresses as valid for the client.

This implementation assumes that there are no loops in the IFES 100. The DHCP process starts after the head end LRUs have been downloaded; and therefore, the "operational" configuration of the IFES 100 should guarantee that no loops exist, which can be achieved by setting the ADB 108, ESU 106, and AVC-D 102 switches appropriately.

Figure 24:
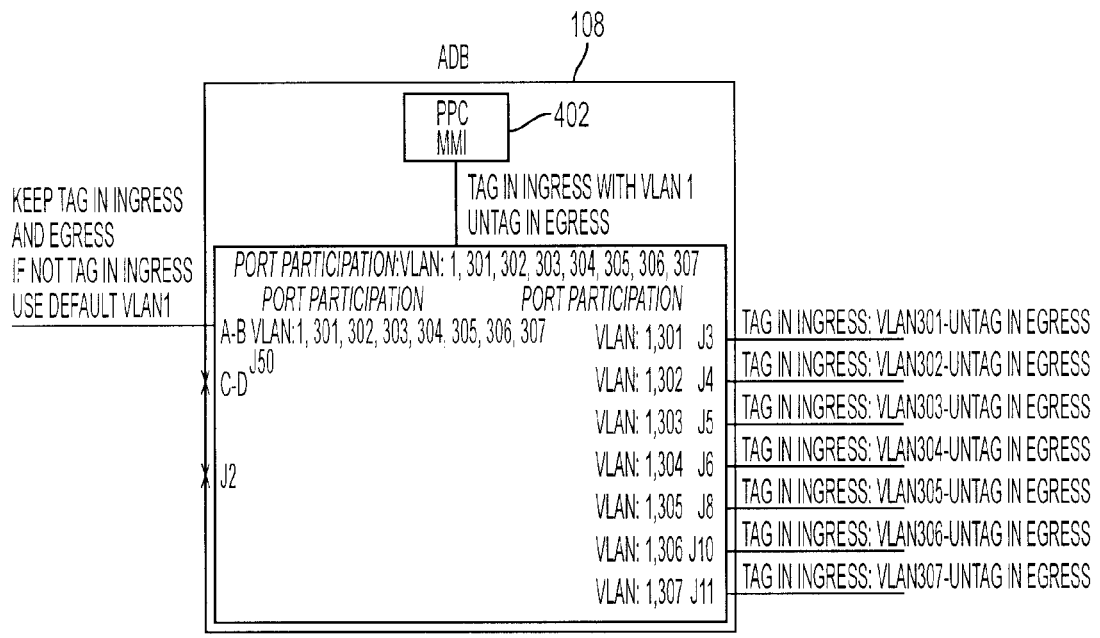
FIG. 24 is a conceptual block diagram illustrating an example of settings of an ADB employed in the IFES shown in FIG. 1, to constrain the traffic generated in a seat column to flow upstream toward the head end equipment of the IFES.

As can be appreciated from the above, an ADB 108 is set to constrain the traffic generated in a seat column to only go upstream toward the head end equipment. FIG. 24 illustrates an example of ADB settings to achieve this function. It is noted that the VLAN numbers indicated are for exemplary purposes, and it is assumed that all output ports are used. The upstream port (J50 pins A-B) participates to all VLANs, so that any frame entering the output ports can reach the head end LRUs, such as the AVC-Ds 102 or LRUs 104. Also, the upstream port keeps whatever tag is in the frame in ingress and egress. The output ports participate to VLAN 1 and their own dedicated VLAN, so that the traffic between columns is kept separated. The ADB switch port connected to the processor (see FIG. 7) tags in ingress with VLAN 1. In addition, this port participates to all VLANs for that ADB 108. In this way, any LRU connected to the ADB 108 can communicate with that ADB 108.

Because of the settings in the AVC-Ds 102 and ADBs 108 and the actual wiring in the current configurations, the ESU VLAN setting does not necessarily guarantee the absence of loops. However, the ESU setting can still be useful to improve traffic control (broadcast traffic reduced) and to provide for unexpected new wiring configurations.

Figure 25:
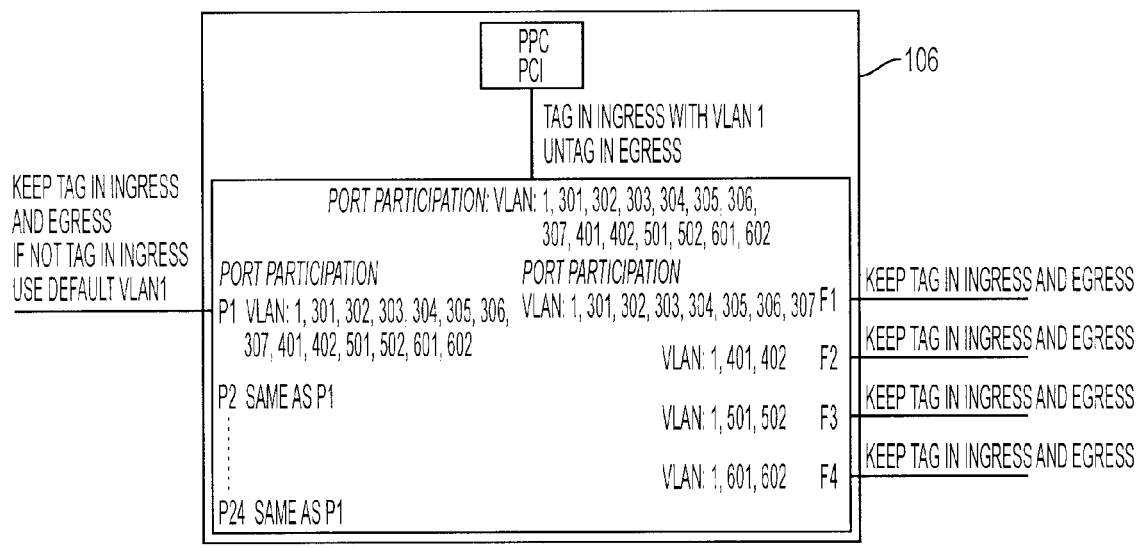
FIG. 25 is a conceptual block diagram illustrating an example of a connection between the ADB and an ESU in the IFES shown in FIG. 1.

FIG. 25 shows an example of a configuration where the ADB 108 connected to ESU 106 fiber port 1 serves 7 seat columns (as in the example of the ADB 108 shown in FIG. 24) and the ADB 108 connected to fiber ports 2, 3, and 4 serve two seat columns each. The setting is such that any frame coming from an ADB 108 can only go upstream towards the other head end LRUs. The upstream ports (P1-P24) are configured to let all traffic pass through on each port, which allows complete flexibility in assigning the DSU 104 servers for AVOD. Hence, there is no need to change the upstream port configuration if the server mapping changes.

The ESU switch port connected to the processor (see FIG. 6) tags in ingress with VLAN 1. In addition, this port participates to all VLANs for that ESU switch. In this way, any LRU connected to this ESU can communicate with this ESU.

As discussed above, each DSU 104 has four network physical interfaces and no switch. Each physical interface has a virtual interface for each column/subnet/VLAN to which the DSU 104 is physically connected through an ESU 106 and ADB 108. With reference to FIGS. 24 and 25, and assuming that FIG. 25 represents an ESU Switch #1, the first physical interface of each DSU 104 will be configured with the following virtual interfaces: vlan1, vlan301, vlan302, vlan303, vlan304, vlan305, vlan307, vlan401, vlan402, vlan501, vlan502, vlan601, vlan602. The other DSU 104 interfaces will be configured analogously, based on the subnet/VLAN definition of the system. Naturally, any suitable configuration can be used.

Figure 26:
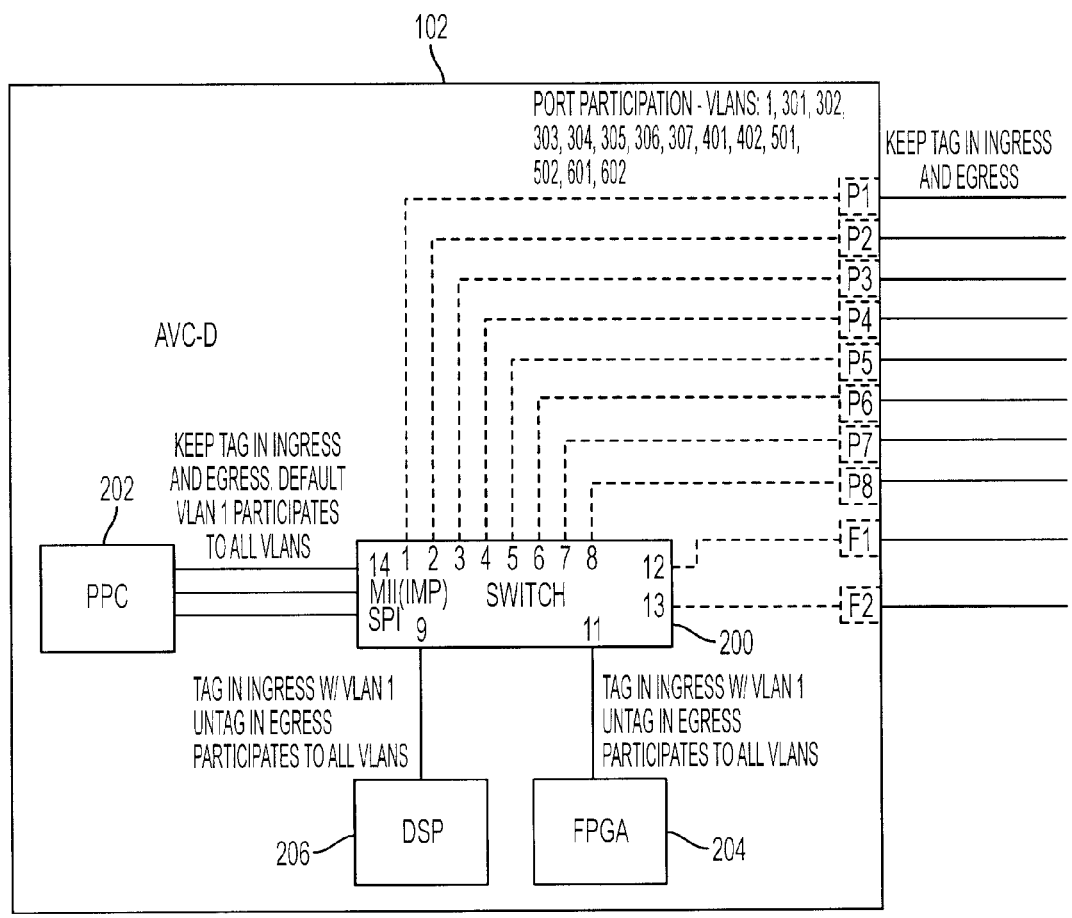
FIG. 26 is a conceptual block diagram illustrating an example of a virtual interface of an AVC-D employed in the IFES shown in FIG. 1.

The AVC-D 102 processor and switch are configured similar to the DSU schema. That is, the port connected to the ESU 106 Switch #1 will participate to all VLANs associated to the columns physically connected to that ESU switch. The same logic applies to the other ports. The AVC-D 102 processor employs a virtual interface for each subnet/VLAN in the system as in the example shown in FIG. 26.

As can be appreciated by one skilled in the art, there can multiple ways to define the subnet size to associate with the seat columns, and each method can have advantages. Two options, referred to "static" and "dynamic," are described herein. The "static" method tries to identify an assignment that is applicable to all aircraft and customers, and is based on the consideration that the maximum number of ADB 108 in an IFES 100 is eleven (e.g., as in an Airbus A380), and that the maximum number of output columns per ADB 108 is seven. Therefore, the maximum theoretical number of seat columns is 77, and the maximum number of subnets is 77, assuming that only one IP address per column is used, or two IP addresses per column is used in case of redundant wiring. The second consideration is that the maximum number of QSEBs 112 in any two A380 paired columns is 40, and assuming 4 SVDUs 114 and 4 TPCU 116 per QSEB 112, the total number of hosts in a subnet would be not greater than 360, and this number would fit in a /23 subnet. Also, because 7 bits are required to identify 77 subnets, and 9 bits are necessary to identify 360 hosts, 9+7=16 is the exact number of bits available for the host part of an IP address in a Class B network.

An advantage of the "static" method is that it is defined once for all for any customers, and little or no effort from system/software customer engineers is required for configuring this part of the system. However, this method can consume all IP addresses available. If new addresses are required for unforeseen reasons (maybe new applications, or particular handling of certain class seats) this schema must be abandoned and another one must be identified.

The "dynamic" method is basically the opposite of the "static" method is to use the minimum number of IP addresses necessary for each configuration. Hence, the number of subnets is related to the actual number and length of seat columns. An advantage of the method is that is very scalable if new IP addresses are required in the future. However, the configuration is specific for each customer; which means that the IP subnet definition is repeated for each customer.

In further considering setup of the IFES 100, it should be noted that many IFES software applications use host names for their communications, with these host names being related to the LRU physical location. For example, in VOD, a client SVDU 114 used by a passenger in seat 1A may need to communicate with server DSU 104-2 and, in particular, Ethernet Port 1 of DSU 104-2 installed in position 3 in the IFEC rack. At the end of the IP addresses assignment phase, an LRU can still be unaware of its physical location and the mapping between IP addresses and physical locations of the other LRUs. Therefore, the IFES 100 can create an entity that contains the current mapping between host names (strictly related to the physical location) and IP addresses, and distribute that map to all LRUs. In the IFES 100, this entity can be a file (e.g., a Linux "hosts" file) that is generated and distributed during a network setup process as shown, for example, in the state diagram of FIG. 27.

Figure 27:
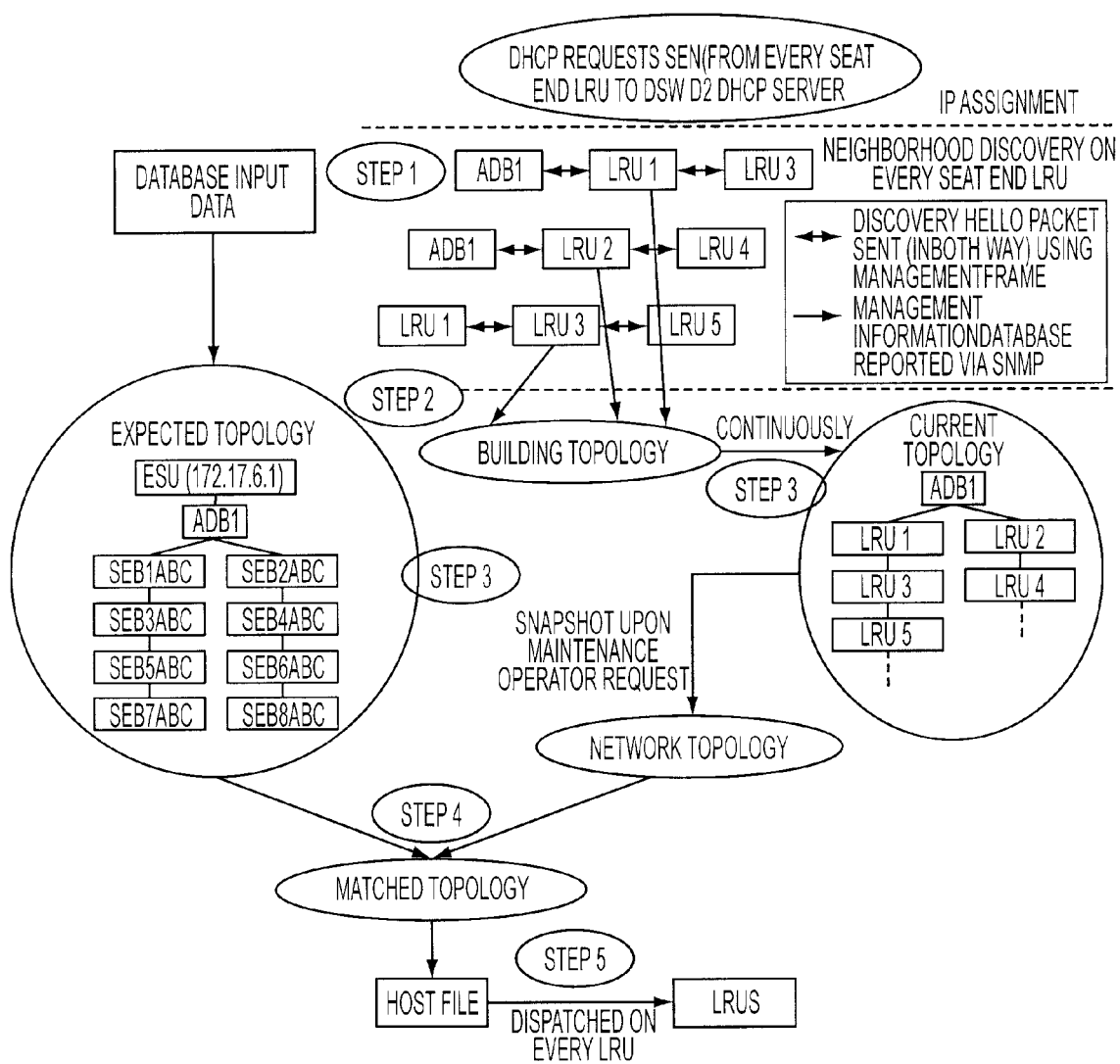
FIG. 27 is a state diagram illustrating an example of operations for IP address mapping that can be performed by components of the IFES shown in FIG. 1.

Step 1 in FIG. 27 can be referred to as the topology discovery phase that employs a link layer discovery protocol (LLDP). IEEE 802.1AB Each LRU sends periodically (e.g., every 5 seconds) a Discovery Hello Packet to its nearest neighbors. This Discovery Hello Packet can include at least the MAC address, IP address, LRU type, egress port (i.e., the switch port from which the packet is sent) and host name of the LRU that sent the Discovery Hello Packet. Each LRU looks for those Discovery Hello Packets coming from the neighbors. After these packets have been exchanged, each LRU is able to build its local Management Information Base (MIB) that contains LRU data and LRU neighbors' data. This process can always be running, if desired, and the MIBs get updated whenever there is a change in the physical configuration (e.g., an LRU is replaced, an LRU failed, etc . . . ).

In Step 2, each MIB is sent to the Network Setup Manager (e.g., located on an AVC-D 102 or DSU 104) through a simple network management protocol (SNMP) trap. The MIB reporting is done periodically until the Manager processes the MIB, and then the MIB reporting is done when the MIB changes. The expected topology, that is, the way that the LRUs can be connected based on, for example, the layout per aircraft (LOPA), can be part of the system database, and can be downloaded in the LRU hosting the Network Setup Manager before this process starts.

In Step 3, upon reception of the MIBs, the Network Setup Manager can build a working topology. This working topology can be updated every time a MIB is reported or is updated. This topology can be seen as a "relative" topology, meaning that the Manager, for example, can tell what the position of a seat end LRU with respect to an ADB 108 is, but does not know what is the name of that LRU (i.e., the physical location). For this purpose, the Manager can use the expected topology that is derived by the system database, and already downloaded in the head end LRU hosting the Network Setup Manager.

In Step 4, upon operator request, the Manager can build a matched topology based on the working and expected topologies. As part of this step, the Manager can also provide information regarding the status of the matched topology, by comparing the new matched topology with the latest validated topology. Hence, this step creates an association between LRU host names and IP addresses.

Figure 28:
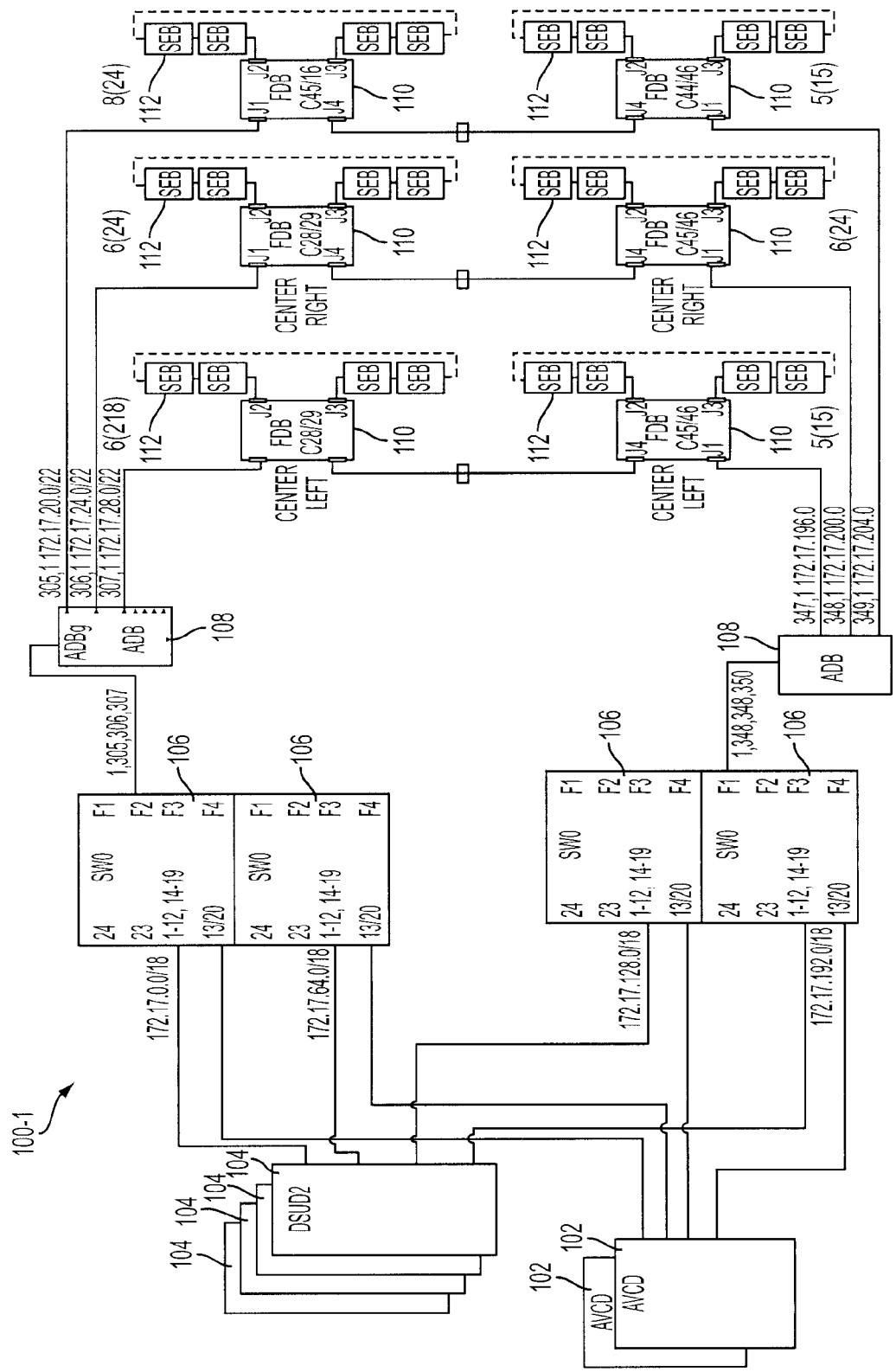
FIG. 28 is a conceptual block diagram illustrating an example of mapped components of an IFES similar to that shown in FIG. 1.

In Step 5, the information regarding the mapping between IP addresses and host names are be made available to all LRUs through, for example, a domain name system (DNS). An example of the mapped IP addresses is shown in FIG. 28. The IFES 100-1 arrangement in this example is similar to IFES 100 shown in FIG. 1 and discussed above, but employs additional FDBs 110 and QSEBs 112.

Figure 29:
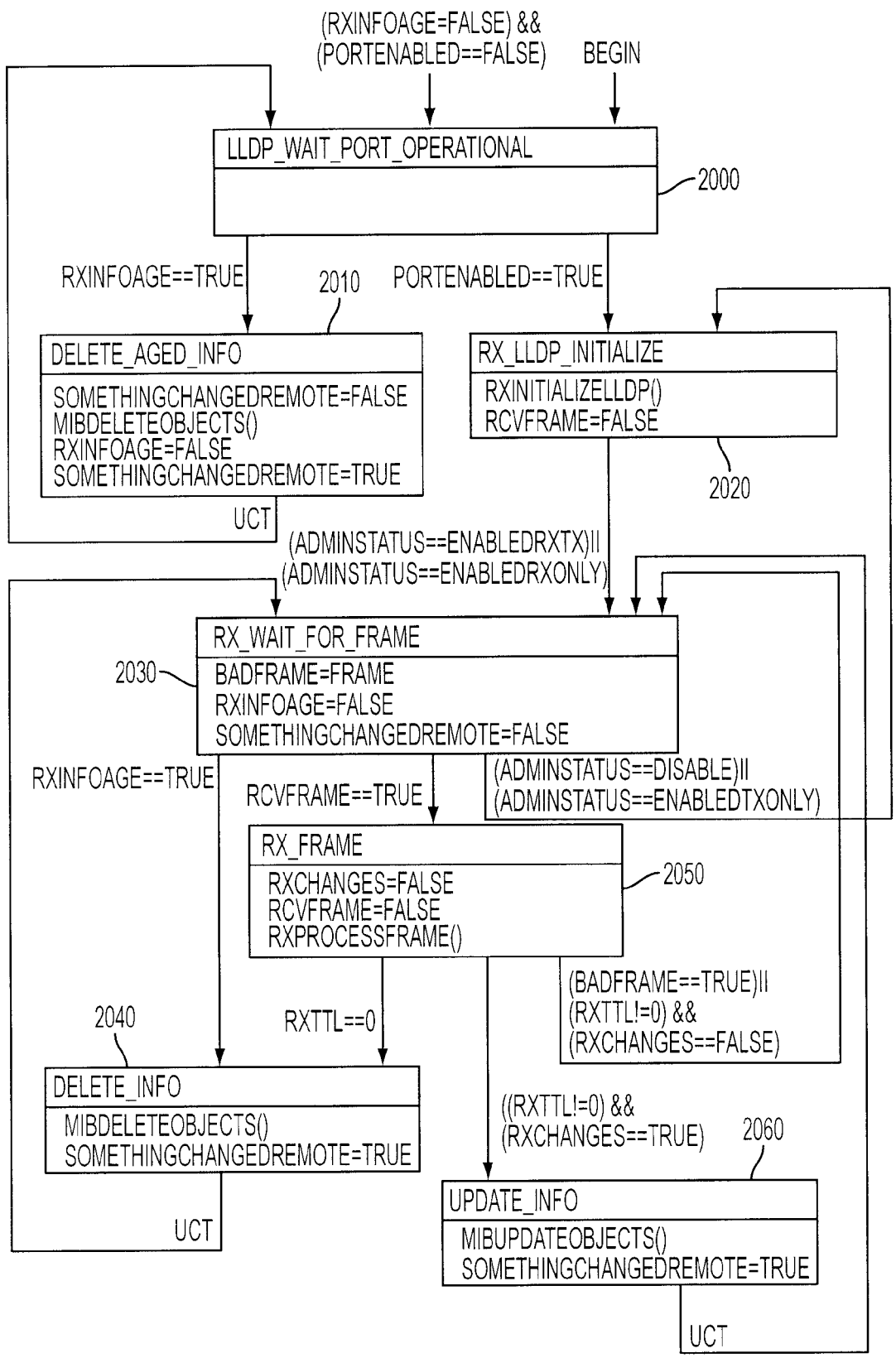
FIG. 29 is a flow diagram illustrating an example of steps performed for aging mapping information that can be performed by components of the IFES shown in FIG. 1.
Figure 30:
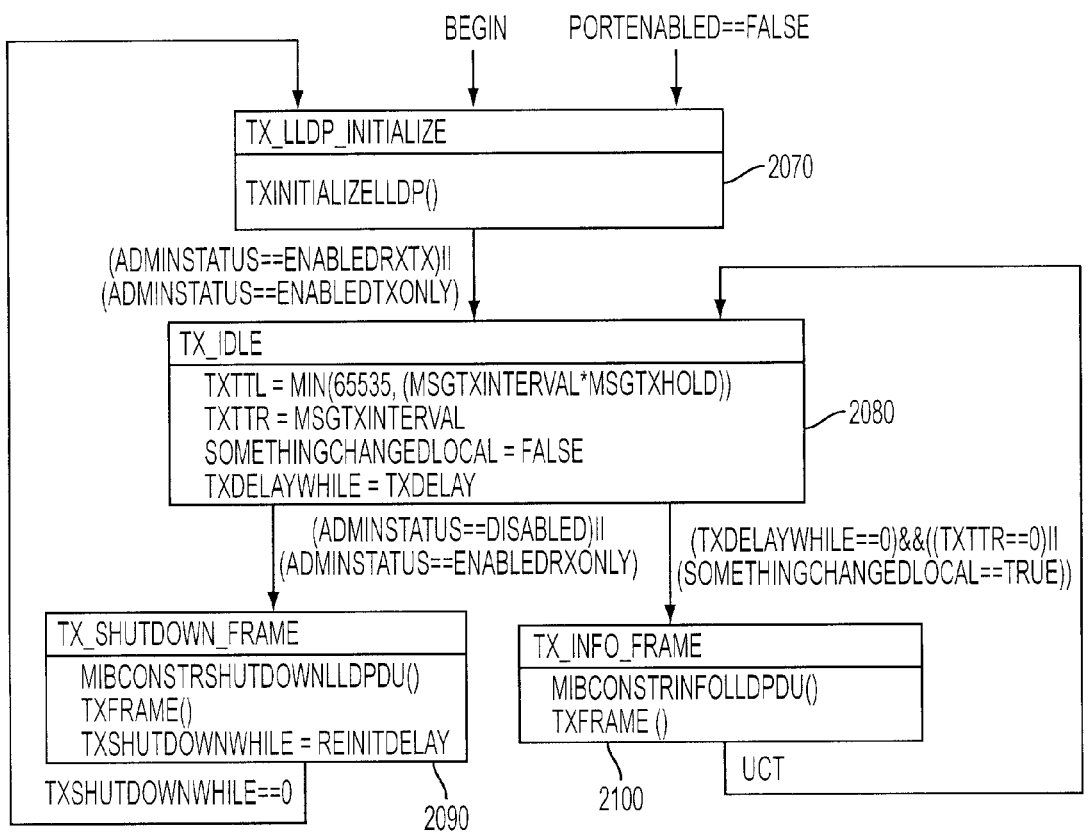
FIG. 30 is a flow diagram illustrating an example of further steps performed for aging mapping information that can be performed by components of the IFES shown in FIG. 1.

As discussed above, each LRU can also age out old entries from its local MIB in the manner as shown, for example, in FIGS. 29 and 30. That is, in Step 2000, an LRU can determine whether its LLDP port is operational and whether the mapping information has become aged while waiting for the port to become enabled. If the mapping information is older than a certain length of time, the processing proceeds to Step 2010 where the aged information is deleted, the variables are set to the values indicated, and this aspect of the processing returns to Step 2000. Also, if it is determined in Step 2000 that the LLDP port is enabled, the processing proceeds to Step 2020 where transmission of the LLDP is initialized and the variables are set as indicated.

That is, the LRU waits to receive a frame in Step 2030. While awaiting receipt of the frame, the variables are set as indicated. If the determined to be older than a certain length of time, that aspect of the processing proceeds to Step 2040 where the old information is deleted from the mapping information and the variables are set as indicated. The processing then returns to Step 2030 to await receipt of the frame. If the frame is received, the processing proceeds to Step 2050 and the variables are set as indicated. If the conditions concerning the reception TTL is determined to be 0, the processing proceeds to Step 2040 where the old information is deleted from the mapping information, and the processing returns to Step 2050. Also, if in Step 2050 the reception TTL is determined to be 0 and there are reception changes, the processing proceeds to Step 2060 where the mapping information is updated, the variables are set as indicated, and the processing returns to Step 2030. In addition, if in Step 2050 it is determined that a bad frame was received, the reception TTL is 0 and there are no reception changes, the processing returns to Step 2030. If, on the other hand, the administrator status is disabled or enabled for transmission only, the processing returns to Step 2020.

Referring back to Step 2000, if the port is not enabled, the processing proceeds as shown in FIG. 29. That is, the transmission LLDP is initialized and the variable is set as indicated in Step 2070. The processing then proceeds to the transmission idle step 2080 where the variables are set as indicated. If the administrator status becomes disabled or is enabled for reception only, the processing proceeds to Step 2090 where the variables are set as indicated and the transmission is shut down. The processing then returns to Step 2070. On the other hand, if the transmission delay and transmission TTR variables are 0 and something has changed in the information, the LRU transmits an information frame and sets the variables as indicated in Step 2100, and the processing returns to Step 2080.

As discussed above, the seat-end devices of the IFES 100, such as the SVDUs 114, have redundant paths to the head-end components, such as the AVC-Ds 102, in various configurations, such as on Airbus A380 aircraft. The head end equipment, such as the AVC-Ds 102, periodically send (e.g., multicast) heartbeat signals to all LRUs to inform the LRUs of the state of the IFE System. The head end equipment (e.g., an AVC-D 102) also can send via multicast low latency audio public address (LLAP) messages to the seat-end LRUs. Although the heartbeat signals and LLAPs are sent via multicast on, for example, VLAN 1 for distribution to seat-end LRUs, the LLAP are to travel to the QSEB 112 processor port and not to any SVDU 114. LLAPs also should be prevented from entering any QSEB 112 from both directions which would cause duplicate packets to reach the FPGA 502 of the QSEB 112. In addition, duplicate heartbeat packets should not reach the SVDUs 114, which are very sensitive to excess Ethernet traffic. Accordingly, the system and method according to an embodiment of the present invention provide a redundancy mechanism for the IFES 100 that enable heartbeat signals to reach all seat end LRUs (e.g., QSEBs 112 and SVDUs 114), and LLAPs to reach all QSEBs 112, in both the initial state and in the event of a failure without the LRUs receiving duplicate heartbeat signals or LLAPs.

As can be appreciated by one skilled in the art, the heartbeat signal can be sent from an AVC-D 102 to a multicast group that can be defined in, for example, a table. The AVC-D processor PPC 202 (see FIG. 5) can send the frame containing the heartbeat through, for example, Port 14 of the AVC-D switch 200, and this Port 14 tags the frame with VLAN 1 in this example. A frame tagged with VLAN1 can reach any LRU. When the frame leaves an ADB 108, the frame is stripped of its tag.

PA and Entertainment Audio messages are encoded in an AVC-D 102 and can be FPGA transmitted through the Ethernet backbone and decoded at the FPGA of the QSEB 112 FPGA. The path followed by these messages is called Low Latency Audio Path (LLAP). The frames carrying PA and EA messages typically should not be broadcast, because they would flood unnecessarily the SVDUs 114. These packets are instead be sent to the multicast address defined in, for example, a table. The switches are thus configured to allow the messages generated in the AVC-D FPGA to reach the FGPAs of the QSEBs 112 and not the SVDUs 114.

The communication between hosts on different subnets is mainly required when, for a given seat, the SVDU 114 and the corresponding TPCU 116 are physically connected to QSEBs 112 that are in different columns. In addition, some applications (e.g. multiplayer games) require direct communication between multiple SVDUs 114. For a seat-end-device to reach another seat-end device that is not in the same subnet (column), the traffic can be routed through one of its designated head-end routers (located in each DSU 104). This configuration can reduce the magnitude of broadcasts to the seat-end devices and still be completely transparent to application software. Because all seat end hosts in all columns can be able to communicate to one another, every DSU 104 can be configured to route between all possible subnets of the system. An example of a routing table that can be used by a DSU 104 is shown in Table 12 below. For each subnet/column, the name of the router can be assigned at the same time that the IP addresses are assigned with DHCP. Because two routers are assigned per each column, in case of failure of the primary router, the secondary router can be used as discussed in more detail below.

TABLE 12

Example of Subnet Routes

| DSU-D2 Interface # | Routes to subnets # (ref. Appendix B) |
| --- | --- |
| 1 | 5 to 32 |
| 2 | 33 to 64 |
| 3 | 65 to 96 |
| 4 | 97 to 128 |

The following description pertaining to the heartbeat messages and LLPAs will refer to Ports 0 and 1 of the QSEBs 112 as shown in FIG. 2. These ports can be embodied by connectors J1 and J2 of the QSEBs 112 as shown in FIG. 8.

Initially, all the switches of the head-end equipment (e.g., AVC-Ds 102 and DSUs 104) can be configured to forward heartbeat signals and LLAPs multicast on all their downstream ports as a "static" configuration. At the seat-end, the QSEBs 112 will initially be configured to multicast forward heartbeat signals to their MII port and SVDU ports (see FIG. 8) and Port 1 (see FIG. 2), and to multicast forward LLAPs to the MI port and Port 1, but not the SVDU ports. This configuration is also the standard configuration for systems without seat-end redundancy, as would be present in Boeing airplanes.

Initially, the multicast addresses of the heartbeat messages and LLAPs are statically configured to forward to Port 1 and the MII port of a QSEB 112, and the IP address is assigned is the first address received from DHCP server. The Initial IGMP router port is Port 0 of a QSEB 112, and the IGMP states are defined for failover as follows. When there is IGMP_State_0, the IGMP Router Port for a QSEB 112 is set to Port 0, and no IGMP join message is sent by the QSEB 112 to enable the QSEB 112 to "join" and receive heartbeat messages and LLAPs. When there is IGMP_State_1, the IGMP Router port of the QSEB 112 is set to Port 1, and the QSEB 112 sends an IGMP join to receive the heartbeat message and LLAPs. When there is IGMP_State_2, the IGMP Router port of the QSEB 112 is set to Port 0, and the QSEB 112 sends an IGMP join message to receive the heartbeat signal and LLAPs.

In addition, the heartbeat packets are detected as management frames by the QSEBs 112 and sent to a heartbeat Netlink socket. The QSEBs 112 do not forward IGMP reports to join heartbeat messages and LLAPs. Also, when a QSEB receives an IGMP leave message for the heartbeat messages and LLAPs from port 1, the QSEB 112 removes the static multiport settings for the heartbeat messages and LLAPs form port 1. A QSEB 112 also keeps track of its current IGMP State.

Figure 31:
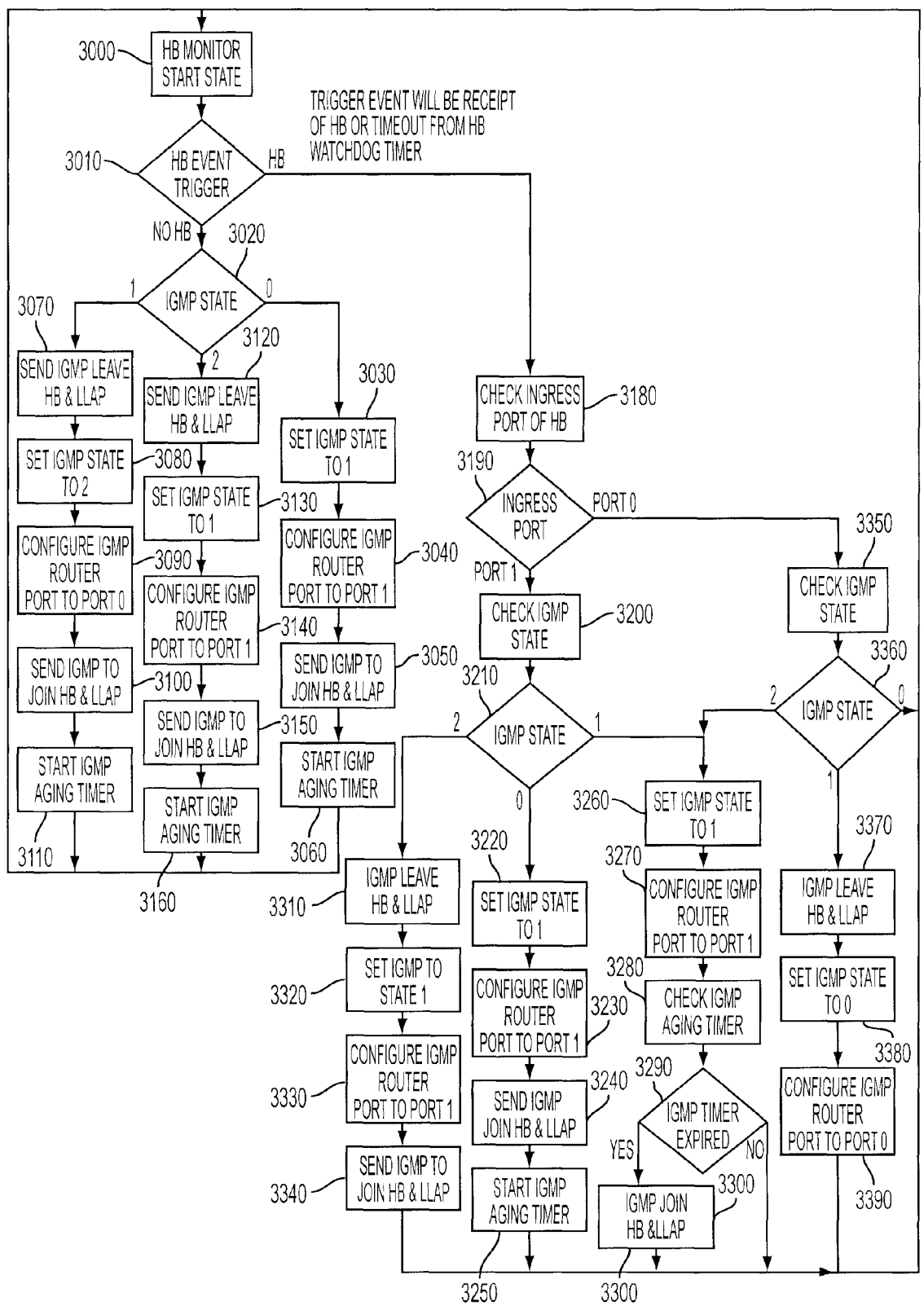
FIG. 31 is a flow diagram illustrating an example of processes that can be performed relating to heartbeat messages and low latency audio public address (LLAP) messages that can be transmitted in the IFES shown in FIG. 1.

The flow diagram of FIG. 31 illustrates examples of the processes described above. As indicated in Step 3000, a QSEB 112 monitors for receipt of a heartbeat signal until a trigger event occurs in Step 3010. A trigger event can be receipt of a heartbeat message, or timeout of the heartbeat timer.

If no heartbeat message is received and the timer times out, the processing proceeds to Step 3020 where the IGMP state is assessed as discussed above. If the IGMP state is 0, the IGMP state is set to 1 in Step 3030, and the IGMP router port is configured as Port 1 of the QSEB 112 in Step 3040. The QSEB 112 sends an IGMP join message in Step 3050 to receive heartbeat messages and LLAPs, the IGMP aging timer is started in Step 3060 and the processing returns to Step 3000.

If the IGMP state is 1, the QSEB 112 sends and IGMP leave message in Step 3070, and the IGMP state is set to 2 in Step 3080. In Step 3090, Port 0 is configured as the IMPG router port of the QSEB 112, and in Step 3100, the QSEB 112 sends an IPMG join message to received heartbeat messages and LLPAs. The IGMP aging timer is stared in step 3110, and the processing returns to Step 3000.

If the IGMP state is 2, the QSEB 112 sends and IGMP leave message in Step 3120, and the IGMP state is set to 1 in Step 3130. In Step 3140, Port 1 is configured as the IMPG router port of the QSEB 112, and in Step 3150, the QSEB 112 sends an IPMG join message to received heartbeat messages and LLPAs. The IGMP aging timer is stared in step 3160, and the processing returns to Step 3000.

On the other hand, if the trigger event detected in Step 3010 is receipt of a heartbeat message, the processing proceeds to Step 3180 where the ingress port is checked. If it is determined in Step 3190 that the ingress port is Port 1, the IGMP state is checked in Step 3200. If the IGMP state is determined to be 0 in Step 3210, the IGMP state is set to 1 in Step 3220, and the IGMP router port is configured as Port 1 of the QSEB 112 in Step 3230. The QSEB 112 sends an IGMP join message in Step 3240 to receive heartbeat messages and LLAPs, the IGMP aging timer is started in Step 3250 and the processing returns to Step 3000.

If the IGMP state is determined to be 0 in Step 3210, the IGMP state is set to 1 in Step 3260, and the IGMP router port is configured as Port 1 of the QSEB 112 in Step 3270. The IGMP aging timer is then checked in step 3280. In Step 3290, if it is determined that the timer has expired, the QSEB 112 sends and IGMP join message in Step 3300 to receive the heartbeat message and LLAPs, and the processing returns to Step 3000. If the timer has not expired, the processing returns to Step 3000.

If the IGMP state is determined to be 2 in Step 3210, the QSEB 112 sends and IGMP leave message in Step 3310, and the IGMP state is set to 1 in Step 3320. In Step 3330, Port 1 is configured as the IMPG router port of the QSEB 112, and in Step 3340, the QSEB 112 sends an IPMG join message to received heartbeat messages and LLPAs. The processing then returns to Step 3000.

Alternatively, if it is determined in Step 3190 that the ingress port is Port 0, the IGMP state is checked in Step 3350. If it is then determine in Step 3360 that the IGMP state is 0, the processing returns to Step 3000. If the IGMP state is 1, the QSEB 112 sends and IGMP leave message in Step 3370, and the IGMP state is set to 0 in Step 3380. In Step 3390, Port 0 is configured as the IMPG router port of the QSEB 112, and the processing then returns to Step 3000. If, on the other hand, the IGMP state is determined to be 2 in Step 3360, the processing proceeds to Step 3260 and continues as discussed above.

Once the SVDUs 114 and TPCUs 116 have their IP addresses assigned and the hosts name information is shared in the IFES 100, the client device (e.g., SVDU 114 or TCPU 116) obtains the streaming servers' allocation (e.g., at a DSU 104) to be able to perform AVOD operations. For each subnet, a pool of servers can be identified that are available for streaming. Each DSU 104 in this example has four physical interfaces, and these interfaces are assigned IP addresses in the subnet that they are to serve. With the use of the VLAN operations and features as discussed above, each physical interface can have multiple virtual interfaces and IP addresses, and be on multiple subnets at the same time. Also, each DSU 104 can communicate directly with each seat-end device (e.g., SVDU 114 or TPCU 116) by having a virtual interface and IP address on each subnet.

The following describes two methods for assigning the DSU servers. These methods are referred to as the "traditional" method and the "Service Registry" method.

The traditional method includes the operations of listing, for each client, the servers to be used and their order of precedence. To provide service redundancy, at least two servers are assigned, and are referred to as the primary and secondary servers. This server assignment can be defined in a database and is typically customer specific. For example, the customer system engineer can have the responsibility to assign the servers so that load balance is ensured.

Figure 32:
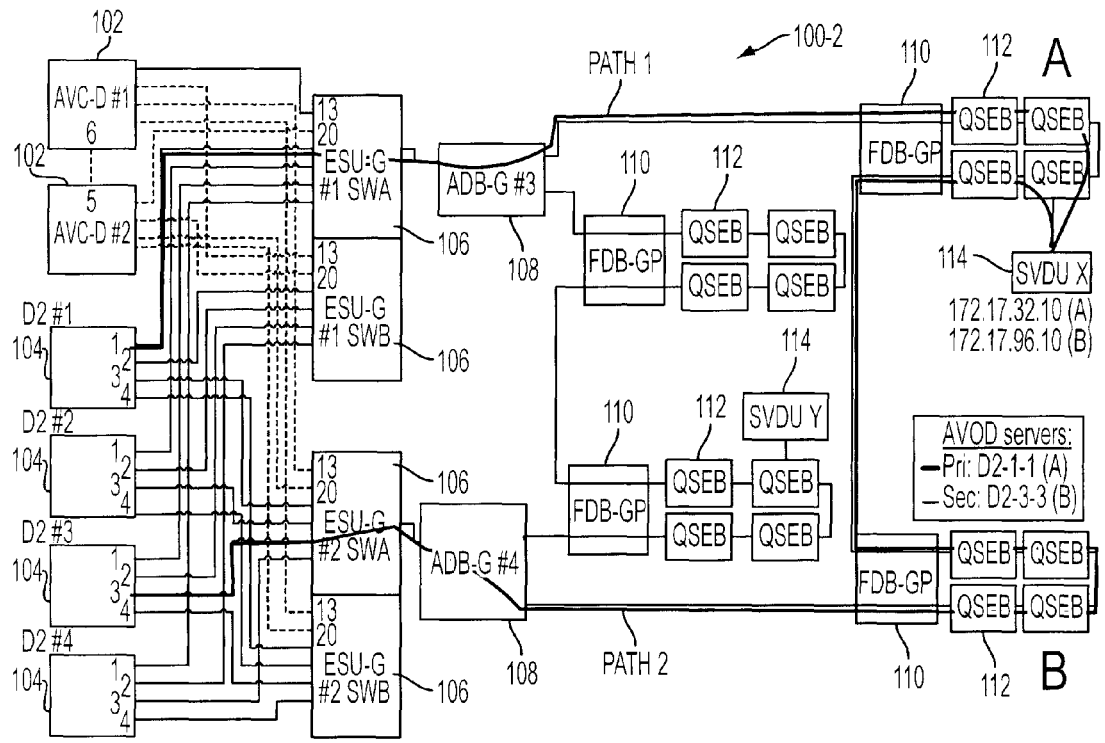
FIG. 32 is a conceptual block diagram illustrating an example of subnet paths in an IFES similar to the IFES shown in FIG. 1.

FIG. 32 illustrates an example of an IFES 100-2 which is similar to IFES 100. This type of configuration can be employed, for example, on an Airbus A380. As illustrated, the client device SVDU 114 identified as "X" has two IP addresses in subnets A and B as indicated, and also has two associated servers, namely, a primary server 104 (D2 #1) on subnet A, and a secondary server 104 (D2 #3) on subnet B. It should be noted that the server allocation respect the physical wiring. In this example, the physical paths from SVDU X to the DSUs 104 go through ESU 106 #1 switch SWA (Path 1), and ESU 106 #2 switch SWA (Path 2). Therefore, according to this wiring, only ports 1 and 3 of any DSU 104 can be used to serve SVDU X.

When SVDU X requests streaming from its primary server DSU 104 (D2 #1), the SVDU X may not know the MAC address of this server. Therefore, the SVDU X can start an ARP request. The ARP message is broadcasted, and will follow the Paths 1 and 2 toward the head end LRUs. When the ARP message reaches an ADB 108, the message can only travel upstream because each ADB 108 output port is participating in a different VLAN. When the ARP message reaches the ESU 106, the ARP message can only go upstream because the ESU fiber ports do not participate in the same VLANs. Hence, all DSU 104 ports (and AVC-D 102 ports) will receive the ARP message, but only the DSU D2 #1 Port 1 in this example has the correct IP address and will respond back with a unicast message to SVDU X. While this unicast frame reaches SVDU X, all switches in the path learn their correct port associated to the server. Therefore, next time SVDU X tries to reach its server a well defined path will be used.

If the primary server fails, the client device SVDU X switches to the secondary server 104 (D2 #3). Specifically, if the client device SVDU X does not receive any RTP streaming for a certain period of time after sending the ARP message (e.g., three seconds), the SVDU X tries to reach another server. Because the secondary server 04 (D2 #3) is on subnet B in this example, SVDU X will use its alias IP address in subnet B as a source address.

Figure 33:
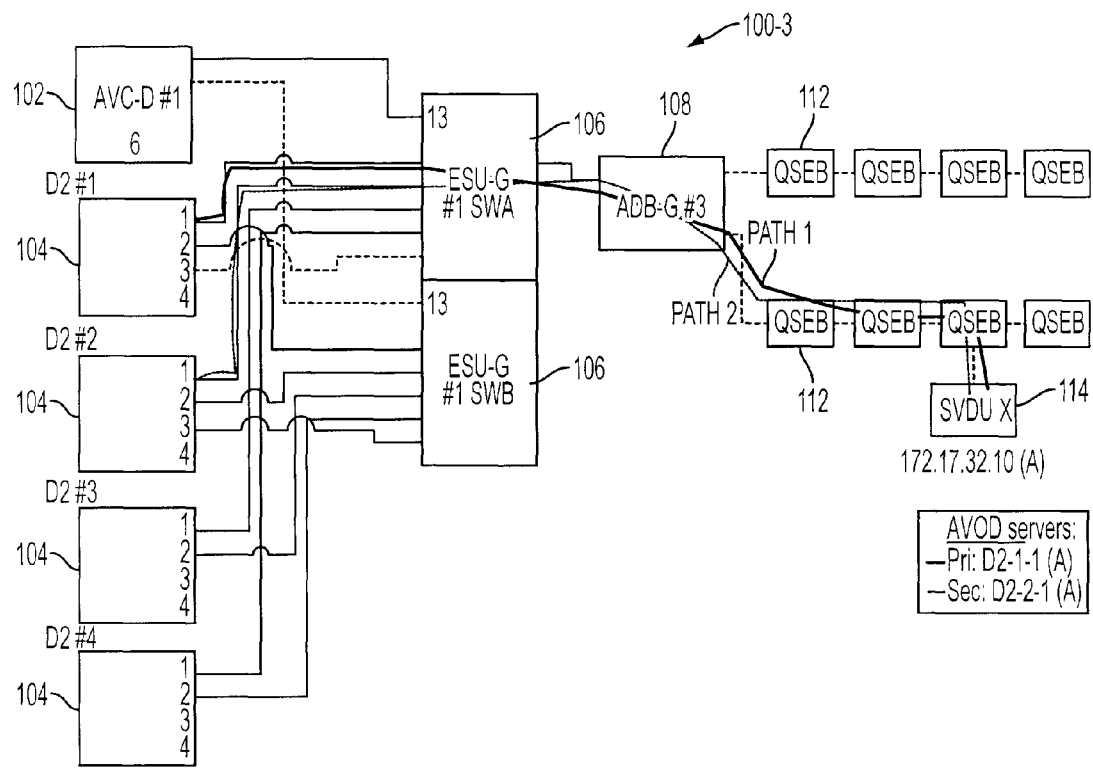
FIG. 33 is a conceptual block diagram illustrating an example of paths in a non-redundant IFES having components similar to those in the IFES shown in FIG. 1.

In the non-redundant configuration of IFES 100-3 as shown in FIG. 33, the SVDU X only needs one IP address (in subnet A, for example), and a primary and secondary server 104 can be in the same subnet. In this arrangement, if the primary server fails, the client device SVDU X will try using the secondary server, which is in same subnet.

The system or systems described above may be implemented on any general purpose computer or computers and the components may be implemented as dedicated applications or in client-server architectures, including a web-based architecture. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions executable on the processor on media such as tape, CD-ROM, etc., where this media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method for sending information from head-end equipment in an in-flight entertainment system (IFES) comprising a plurality of switches, to one of a plurality of seat-end devices in seat-end equipment in the IFES, the method comprising:

assigning each of the plurality of switches and plurality of seat-end devices to at least one Internet Protocol (IP) subnet in the IFES, wherein a first plurality of the plurality of seat-end devices are a member of both a first IP subnet and a second IP subnet, the first plurality of seat-end devices communicatively coupled with the head-end equipment via both the first IP subnet and the second IP subnet, the first plurality of seat-end devices comprising the one seat-end device;

issuing, by the one seat-end device, a request for the information via the first IP subnet;

tagging, by a switch that receives the request, the request based on the first IP subnet in which the one seat end device resides; and sending the information from the head-end equipment to the one seat-end device along an original path including at least one of the switches based on the tag of the request, wherein the first IP subnet comprises the original path, the second IP subnet comprises a redundant path from the head-end equipment to the one seat-end device, the redundant path including at least one switch different from the at least one switch included in the original path, and when a failure occurs in the original path, sending the information along the redundant path to one seat-end device.

2. The method as claimed in claim 1, further comprising:

operating any of the plurality of switches to allow the request to travel in a direction toward the head-end equipment based on the tag while prohibiting the request from traveling in a direction toward the one seat-end device.

3. The method as claimed in claim 1, wherein:

the assigning step includes arranging the subnets as virtual local area networks (VLANs).

4. The method as claimed in claim 1 wherein the redundant path and the original path are simultaneously active.

5. The method as claimed in claim 4, wherein, when the failure occurs in the original path, sending the information along the simultaneously active redundant path to the seat-end device without reconfiguring the network.

6. The method as claimed in claim 1, wherein:
the seat-end device includes a smart video display unit (SVDU) or a tethered passenger control unit (TPCU).

7. The method as claimed in claim 1, further comprising:
providing periodic messages from the head-end equipment to the seat-end equipment to notify the seat-end equipment of operation of the head-end equipment.

8. The method as claimed in claim 7, wherein:
the seat-end equipment includes a plurality of seat electronics boxes, at least one of which having a smart video display unit (SVDU) coupled thereto; and
the method further comprises operating any of the seat electronics boxes having at least one SVDU coupled thereto to refrain from forwarding the periodic messages to the SVDU.

9. The method as claimed in claim 1, further comprising:
providing a low latency audio public address (LLAP) message from the head-end equipment to the seat-end equipment.

10. The method as claimed in claim 9, wherein:
the seat-end equipment includes a plurality of seat electronics boxes, at least one of which having a smart video display unit (SVDU) coupled thereto; and
the method further comprises operating any of the seat electronics boxes having at least one SVDU coupled thereto to refrain from forwarding the LLAP message to the SVDU.

11. The method as claimed in claim 1, wherein:
the assigning step includes assigning respective Internet Protocol (IP) addresses to each of the head-end equipment, switches and seat-end equipment.

12. The method as claimed in claim 1, further comprising:
mapping a tagged frame to a virtual local area network (VLAN) using port-based mapping based on a switch port on which the frame arrives.

13. The method as claimed in claim 1, further comprising:
declaring a VLAN association by an end station or switch using a tag field carried within a frame.

14. The method as claimed in claim 13, wherein a VLAN Protocol Identifier (VPID) field identifies the frame as being VLAN tagged, and the VPID field is used to differentiate tagged frames from untagged frames.

15. The method as claimed in claim 1, further comprising:
assigning IP addresses to column devices so that the column devices will be part of the same subnet.

16. The method as claimed in claim 15, further comprising:
providing redundant wiring for the column devices; and
assigning two IP addresses per device such that all devices in paired columns have IP addresses in the same two subnets.

17. A system for providing in-flight entertainment data in a vehicle, comprising:
head-end equipment;
seat-end devices comprising seat-end equipment, the seat-end devices comprising a first plurality of seat-end devices that are a member of both a first Internet Protocol (IP) network subnet and a second IP network subnet, the first plurality of seat-end devices communicatively coupled with the head-end equipment via both the first IP network subnet and the second IP network subnet;
an original path connecting the head-end equipment and a seat-end device that is one of the first plurality of seat-end devices via the first IP network subnet;
a redundant path connecting the head-end equipment and the one seat-end device via the second IP network subnet;
a switch within the original path that is assigned to the first IP network subnet; and
a switch within the redundant path that is different from the switch within the original path and that is assigned to the second IP network subnet;
the one seat-end device having an output at which the one seat-end device sends a request for information via the first IP network subnet, the switch within the original path having an input at which the switch within the original path receives the request for information and tags the request based on the first IP network subnet via which the one seat-end device sends the request, and the head-end equipment having an output at which the head-end equipment sends information requested to the one seat-end device along the original path including the switch within the original path based on the tag of the request, wherein the redundant path is active when the original path is active such that when a failure occurs in the original path, information requested from the head-end equipment by the one seat-end device is sent along the redundant path to the seat-end device.

18. The system as claimed in claim 17, wherein the head-end equipment comprises a plurality of servers including an original server to which the request was addressed, and a redundant server that sends the requested information in response to a new request from the seat-end device when the original server fails.

* * * * *